United States Patent
Chung et al.

(10) Patent No.: US 9,497,006 B2
(45) Date of Patent: Nov. 15, 2016

(54) METHOD AND APPARATUS FOR TRANSMITTING UPLINK SIGNALS IN WIRELESS COMMUNICATION SYSTEM FOR SUPPORTING MULTIPLE ANTENNA TRANSMISSION

(75) Inventors: Jae Hoon Chung, Anyang-si (KR); Hyun Soo Ko, Anyang-si (KR); Min Seok Noh, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1080 days.

(21) Appl. No.: 13/388,661

(22) PCT Filed: Aug. 6, 2010

(86) PCT No.: PCT/KR2010/005168
§ 371 (c)(1),
(2), (4) Date: Feb. 2, 2012

(87) PCT Pub. No.: WO2011/016691
PCT Pub. Date: Feb. 10, 2011

(65) Prior Publication Data
US 2012/0127948 A1   May 24, 2012

Related U.S. Application Data

(60) Provisional application No. 61/231,677, filed on Aug. 6, 2009.

(51) Int. Cl.
*H04W 4/00* (2009.01)
*H04L 5/00* (2006.01)
*H04L 25/03* (2006.01)

(52) U.S. Cl.
CPC ........... *H04L 5/0053* (2013.01); *H04L 5/0055* (2013.01); *H04L 5/0057* (2013.01); *H04L 25/03343* (2013.01)

(58) Field of Classification Search
USPC ........................................... 370/329
See application file for complete search history.

(56) References Cited

U.S. PATENT DOCUMENTS

2009/0073922 A1    3/2009  Malladi et al.
2009/0122857 A1*   5/2009  Li et al. ................. 375/239
(Continued)

OTHER PUBLICATIONS

A. Ghosh et al., "Multi-Antenna System Design for 3GPP LTE", IEEE International Symposium on Wireless Communication Systems, pp. 478-482, Oct. 2008.

*Primary Examiner* — Gregory Sefcheck
*Assistant Examiner* — Majid Esmaeilian
(74) *Attorney, Agent, or Firm* — Lee, Hong, Degerman, Kang & Walmey

(57) ABSTRACT

The present invention relates to a wireless communication system, and more particularly to a method and an apparatus for transmitting uplink signals in a wireless communication system for supporting multiple antenna transmissions. The method for transmitting the uplink signals in the wireless communication system for supporting the multiple antenna transmissions according to an embodiment of the present invention comprises the steps of: receiving a PDCCH (Physical Downlink Control Channel) including uplink grant information for indicating a first rank value; precoding uplink data on the basis of the first rank value; precoding uplink control information on the basis of a second rank value; multiplexing the precoded uplink data and the uplink control information on a PUSCH (Physical Uplink Shared Channel) resource; and transmitting the multiplexed uplink data and the uplink control information. The uplink control information can include channel state information and the second rank value can be less than or equal to the first rank value.

7 Claims, 18 Drawing Sheets

(56) References Cited

U.S. PATENT DOCUMENTS

| | | | |
|---|---|---|---|
| 2009/0232070 A1 | 9/2009 | Muharemovic et al. | |
| 2009/0285193 A1* | 11/2009 | Kim | H04L 5/0007 370/342 |
| 2010/0067461 A1* | 3/2010 | Kwak | H04L 1/0026 370/329 |
| 2010/0091678 A1* | 4/2010 | Chen | H04B 7/024 370/252 |
| 2010/0215109 A1* | 8/2010 | Onggosanusi et al. | 375/260 |
| 2011/0105137 A1* | 5/2011 | Gaal | H04B 7/0617 455/452.1 |
| 2011/0141928 A1* | 6/2011 | Shin et al. | 370/252 |

\* cited by examiner

NORMAL CP (a)

EXTENDED CP (b)

(a)

(b)

METHOD AND APPARATUS FOR TRANSMITTING UPLINK SIGNALS IN WIRELESS COMMUNICATION SYSTEM FOR SUPPORTING MULTIPLE ANTENNA TRANSMISSION

CROSS-REFERENCE TO RELATED APPLICATIONS

This application is the National Stage filing under 35 U.S.C. 371 of International Application No. PCT/KR2010/005168, filed on Aug. 6, 2010, which claims the benefit of U.S. Provisional Application Ser. No. 61/231,677, filed on Aug. 6, 2009, the contents of which are all incorporated by reference herein in their entirety.

TECHNICAL FIELD

The present invention relates to a wireless communication system, and more particularly, to a method and apparatus for transmitting an uplink signal in a wireless communication system supporting multiple antenna transmission.

BACKGROUND ART

Single Carrier-Frequency Division Multiple Access (SC-FDMA) is employed as an uplink multiple access scheme in the $3^{rd}$ Generation Partnership Project Long Term Evolution (3GPP LTE) standard (e.g. release 8 or 9). Introduction of clustered Discrete Fourier Transform-spread-Orthogonal Frequency Division Multiplexing (DFT-s-OFDMA) as an uplink multiple access scheme is under discussion in the 3GPP LTE-Advanced (LTE-A) standard (e.g. release 10) being an evolution of the 3GPP LTE standard. In addition, the 3GPP LTE standard supports uplink transmission through one transmission antenna of a User Equipment (UE), whereas the 3GPP LTE-A standard considers support of uplink transmission through a plurality of transmission antennas of a UE. Uplink/down link transmission in a single carrier band is supported in the 3GPP LTE standard and uplink/downlink transmission according to a technology of providing a broad band by grouping a plurality of carriers (i.e. carrier aggregation) is under discussion in the 3GPP LTE-A standard.

There exists a need for defining additional uplink transmission modes based on an uplink transmission mode defined by the 3GPP LTE standard in a wireless communication system conforming to the 3GPP LTE-A standard. The additional uplink transmission modes may be used in combination with the afore-described uplink multiple access schemes and carrier aggregation.

DISCLOSURE

Technical Problem

An object of the present invention devised to solve the conventional problem is to provide various available uplink transmission modes and methods for signaling, configuring a reference signal, and transmitting an uplink control signal in relation to the transmission modes in a wireless communication system supporting uplink multiple antenna transmission.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for transmitting an uplink signal in a wireless communication system supporting multiple antenna transmission includes receiving a Physical Downlink Control Channel (PDCCH) that includes uplink grant information indicating a first rank value, precoding uplink data based on the first rank value, precoding uplink control information based on a second rank value, multiplexing the precoded uplink data and the precoded uplink control information into Physical Uplink Shared Channel (PUSCH) resources, and transmitting the multiplexed uplink data and control information. The uplink control information may include Channel State Information (CSI) and the second rank value may be equal to or smaller than the first rank value.

The CSI may be transmitted only for one codeword of the uplink data.

The first rank value may be a transmission rank of the uplink data and the second rank value may be predetermined and shared between an uplink signal transmitter and an uplink signal receiver.

The uplink data may be precoded using a first precoding matrix corresponding to the first rank value and the uplink control information may be precoded using a part of column vectors of the first precoding matrix.

The second rank value may be 1 or 2.

The uplink control information may further include at least one of ACKnowledgment/Negative ACKnowledgment (ACK/NACK) information and a Rank Indicator (RI).

In another aspect of the present invention, a User Equipment (UE) for transmitting an uplink signal in a wireless communication system supporting multiple antenna transmission includes a reception module for receiving a downlink signal, a transmission module for transmitting the uplink signal, and a processor connected to the reception module and the transmission module, for controlling an operation of the UE. The processor controls reception of a PDCCH that includes uplink grant information indicating a first rank value through the reception module, controls precoding of uplink data based on the first rank value, precoding of uplink control information based on a second rank value, and multiplexing of the precoded uplink data and the precoded uplink control information into PUSCH resources, and controls transmission of the multiplexed uplink data and control information through the transmission module. The uplink control information may include CSI and the second rank value may be equal to or smaller than the first rank value.

The above overall description and a later detailed description of the present invention are purely exemplary and given as an additional description of the present invention determined by the appended claims.

Advantageous Effects

According to the present invention, various available uplink transmission modes and methods for signaling, configuring a reference signal, and transmitting an uplink control signal in relation to the transmission modes in a communication system supporting multiple antenna transmission are provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
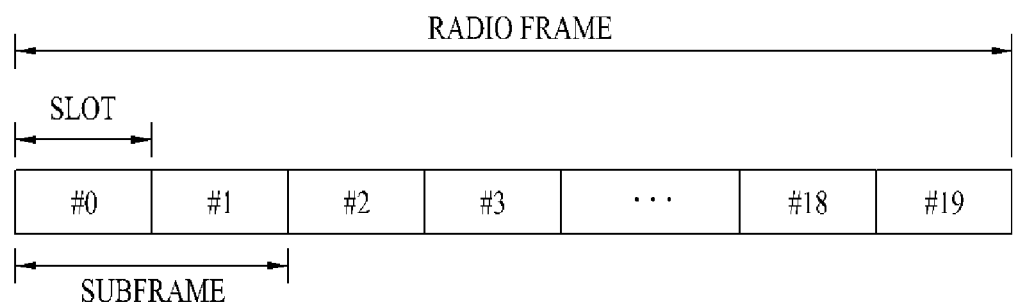
FIG. 1 illustrates the structure of a radio frame in a $3^{rd}$ Generation Partnership Project Long Term Evolution (3GPP LTE) system.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc. The term 'UE' may be replaced with the term 'terminal', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

FIG. 1 illustrates a radio frame structure in the 3GPP LTE system. A radio frame is divided into 10 subframes. Each subframe is further divided into two slots in the time domain. A unit time during which one subframe is transmitted is defined as Transmission Time Interval (TTI). For example, one subframe may be 1 ms in duration and one slot may be 0.5 ms in duration. A slot may include a plurality of Orthogonal Frequency Division Multiplexing (OFDM) symbols in the time domain. Because the 3GPP LTE system adopts OFDMA for downlink, an OFDM symbol represents one symbol period. A symbol may be referred to as an SC-FDMA symbol or symbol period on the uplink. A Resource Block (RB) is a resource allocation unit including a plurality of contiguous subcarriers in a slot. This radio frame structure is purely exemplary and thus the number of subframes in a radio frame, the number of slots in a subframe, or the number of OFDM symbols in a slot may vary.

Figure 2:
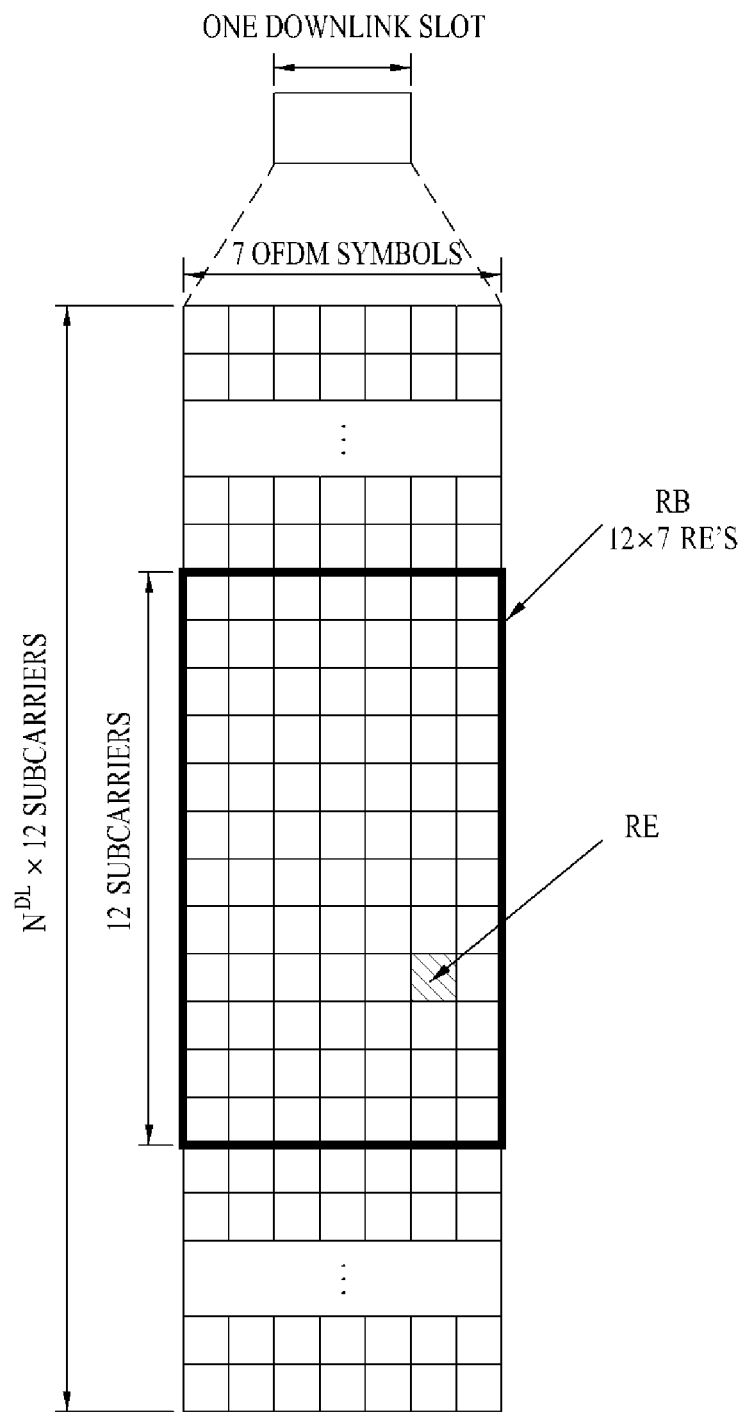
FIG. 2 illustrates the structure of a downlink resource grid for the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot includes 7 OFDM symbols in case of a normal Cyclic Prefix (CP), whereas a downlink slot includes 6 OFDM symbols in case of an extended CP. Each element of the resource grid is referred to as a Resource Element (RE). An RB includes 12×7 REs. The number of RBs in a downlink slot, $N^{DL}$ depends on a downlink transmission bandwidth. An uplink slot may have the same structure as a downlink slot.

Figure 3:
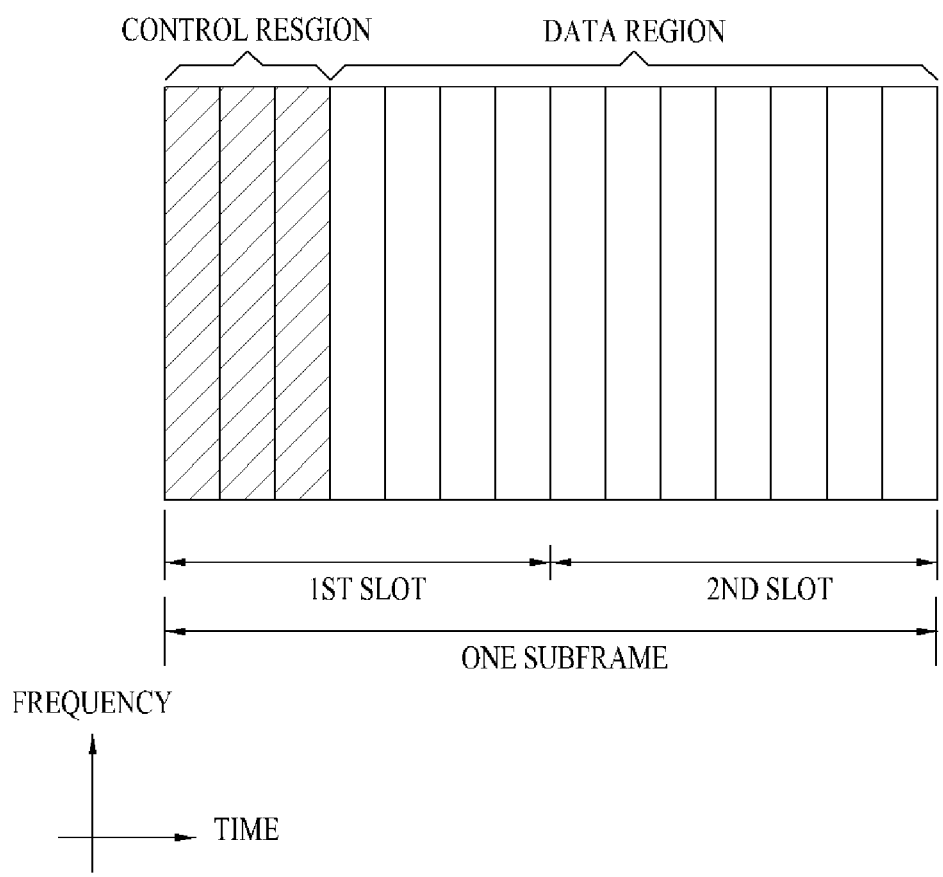
FIG. 3 illustrates the structure of a downlink subframe.

FIG. 3 illustrates a downlink subframe structure. Up to three OFDM symbols at the start of the first slot in a downlink subframe are used for a control region to which control channels are allocated and the other OFDM symbols of the downlink subframe are used for a data region to which a Physical Downlink Shared Channel (PDSCH) is allocated. Downlink control channels used in the 3GPP LTE system include a Physical Control Format Indicator Channel (PC-FICH), a Physical Downlink Control Channel (PDCCH), and a Physical Hybrid automatic repeat request (ARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a set of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
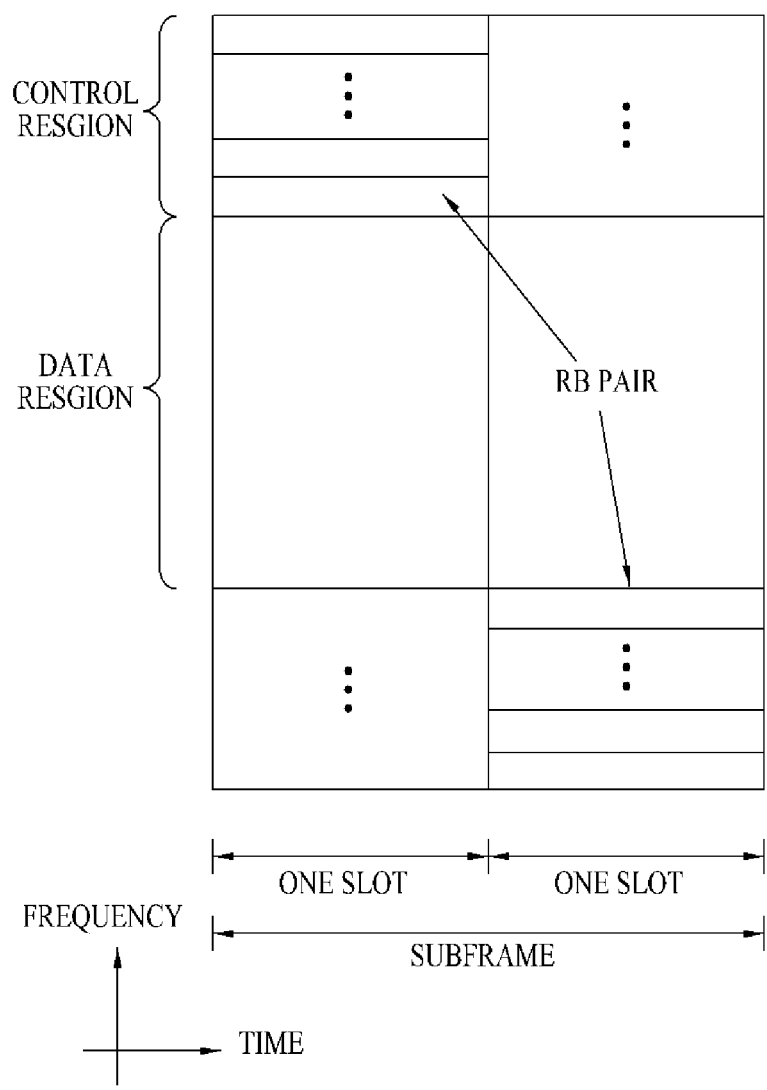
FIG. 4 illustrates the structure of an uplink subframe.

FIG. 4 illustrates an uplink subframe structure. An uplink subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain single-carrier characteristics, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Uplink Multiple Access Schemes

A description will be given below of uplink multiple access schemes.

First of all, an SC-FDMA transmission scheme will be described. SC-FDMA is also called DFT-s-OFDMA, different from later-described clustered DFT-s-OFDMA. SC-FDMA is a transmission scheme that keeps a Peak-to-Average Power Ratio (PAPR) or Cube Metric (CM) value low and efficiently transmits a signal, avoiding the non-linear distortion area of a power amplifier. PAPR is a parameter representing waveform characteristics, computed by dividing the peak amplitude of a waveform by a time-averaged Root Mean Square (RMS) value. CM is another parameter representing a value that PAPR represents. PAPR is associated with a dynamic range that a power amplifier should support in a transmitter. That is, to support a high-PAPR transmission scheme, the dynamic range (or linear area) of the power amplifier needs to be wide. As a power amplifier has a wider dynamic range, it is more expensive. Therefore, a transmission scheme that maintains a PAPR value low is favorable for uplink transmission. In this context, due to the advantage of low PAPR, SC-FDMA is employed as an uplink transmission scheme in the current 3GPP LTE system.

Figure 5:
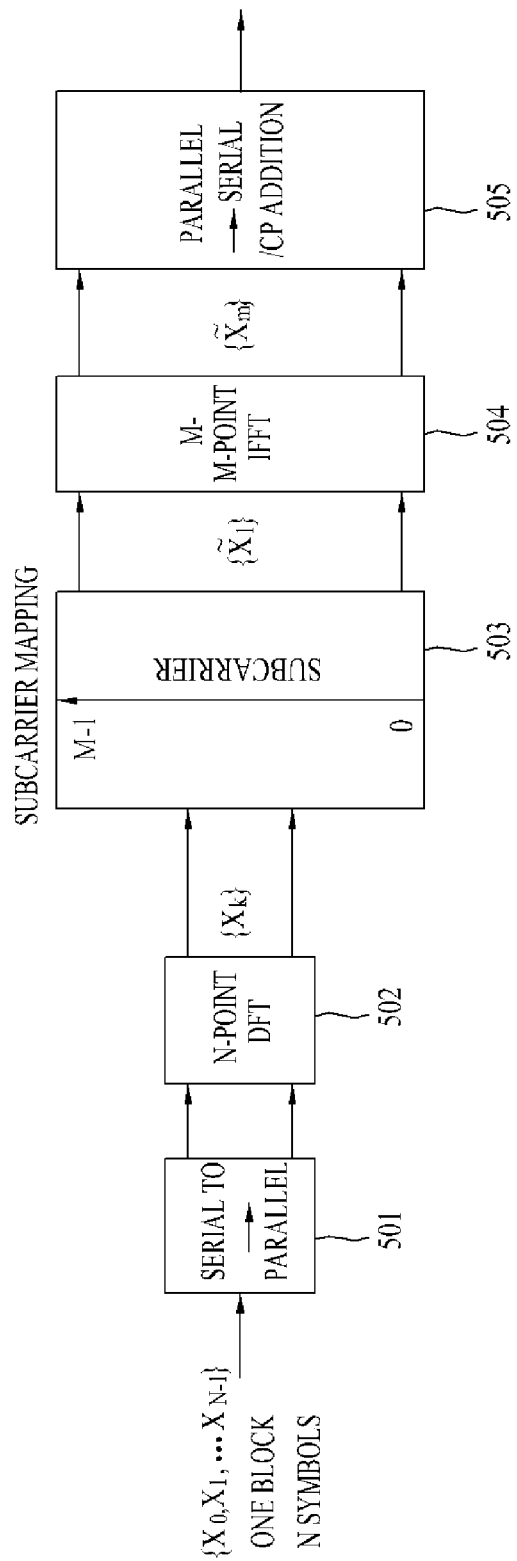
FIG. 5 is a block diagram of a Single Carrier-Frequency Division Multiple Access (SC-FDMA) transmitter.

FIG. 5 is a block diagram of an SC-FDMA transmitter.

A serial-to-parallel converter 501 converts one block of N symbols input to the transmitter to parallel signals. An N-point DFT module 502 spreads the parallel signals and a subcarrier mapping module 503 maps the spread parallel signals to a frequency area. Each subcarrier signal is a linear combination of N symbols. An M-point Inverse Fast Fourier Transform (IFFT) module 504 converts the mapped frequency signals to time signals. A parallel-to-serial converter 505 converts the time signals to a serial signal and adds a CP to the serial signal. The DFT processing of the N-point DFT module 502 compensates for the effects of the IFFT processing of the M-point IFFT module 504 to a certain degree. The signals input to the DFT module 502 have a low PAPR which is increased after the DFT processing. The IFFT signals output from the IFFT module 504 may have a low PAPR again.

Figure 6:
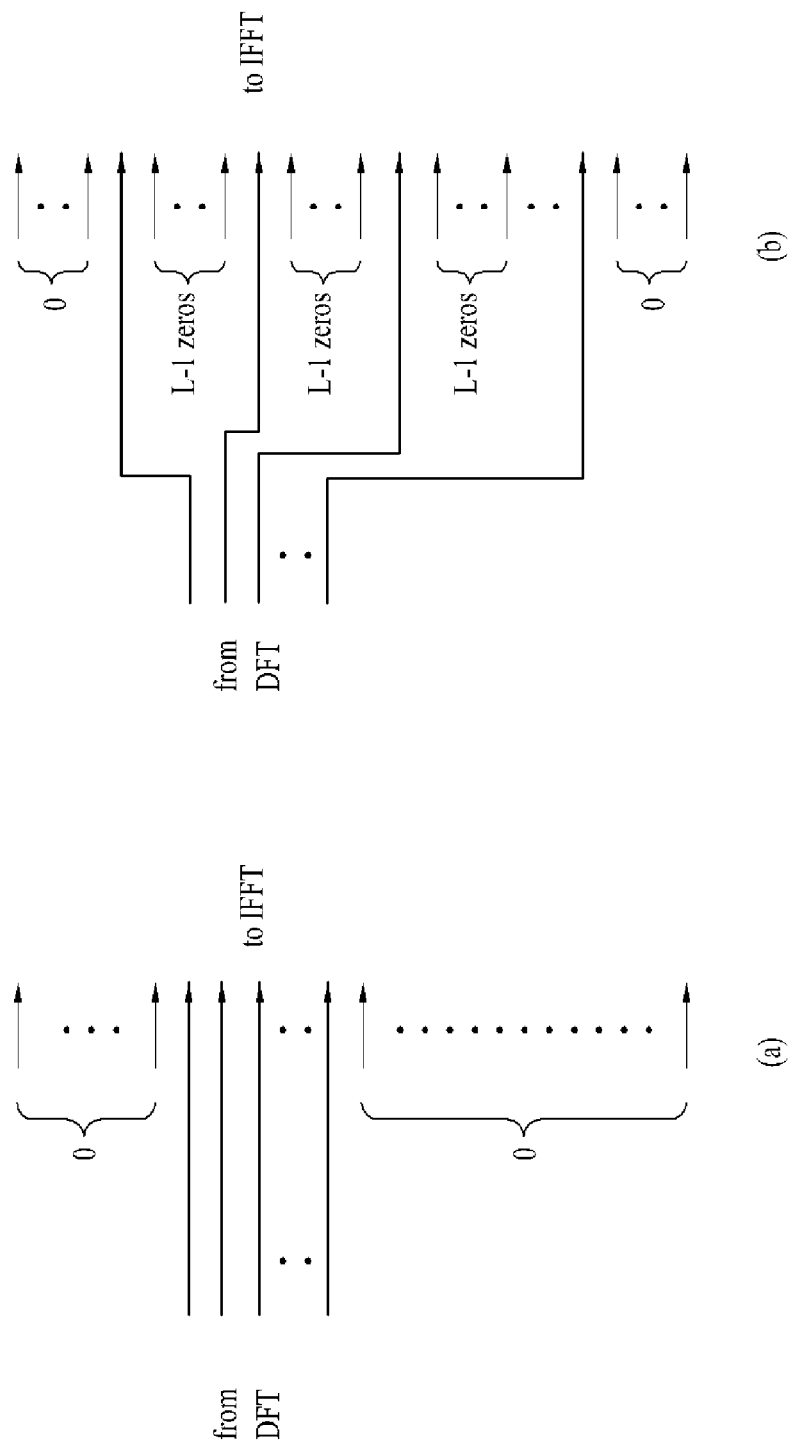
FIG. 6 illustrates methods for mapping signals output from a Discrete Frequency Transform (DFT) module illustrated in FIG. 5 to a frequency area.

FIG. 6 illustrates methods for mapping signals output from the DFT module 502 to a frequency area. A signal output from the SC-FDMA transmitter may satisfy single-carrier characteristics by performing one of two mapping schemes illustrated in FIG. 6. FIG. 6(a) illustrates a localized mapping scheme in which the signals output from the DFT module 502 are mapped only to a specific part of a subcarrier area. FIG. 6(b) illustrates a distributed mapping scheme in which the signals output from the DFT module 502 are mapped across a total subcarrier area. The legacy 3GPP LTE standard (e.g. release 8) uses localized mapping.

Figure 7:
FIG. 7 is a block diagram illustrating DeModulation Reference Signal (DM-RS) transmission in case of SC-FDMA transmission.

FIG. 7 is a block diagram illustrating transmission of a Reference signal (RS) for use in demodulating a signal transmitted in SC-FDMA. According to the legacy 3GPP LTE standard (e.g. release 8), while a time signal of data is converted to a frequency signal by DFT, mapped to subcarriers, IFFT-processed, and then transmitted (refer to FIG. 5), an RS is generated directly in the frequency domain without DFT processing (701), mapped to subcarriers (702), IFFT-processed (703), attached with a CP, and then transmitted.

Figure 8:
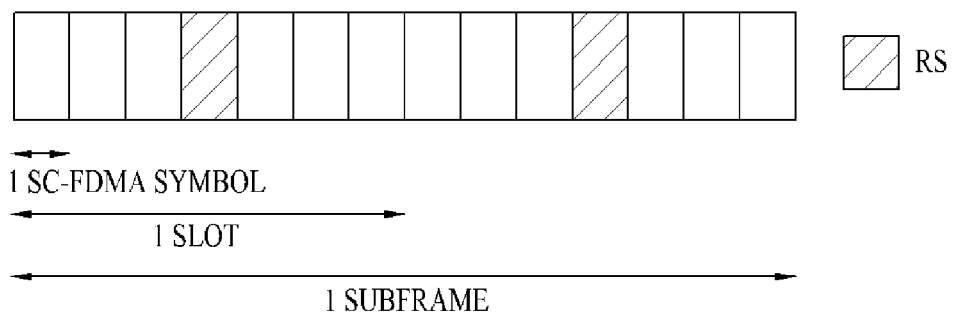
FIG. 8 illustrates the positions of symbols to which RSs are mapped in an SC-FDMA subframe structure.
Figure 8:
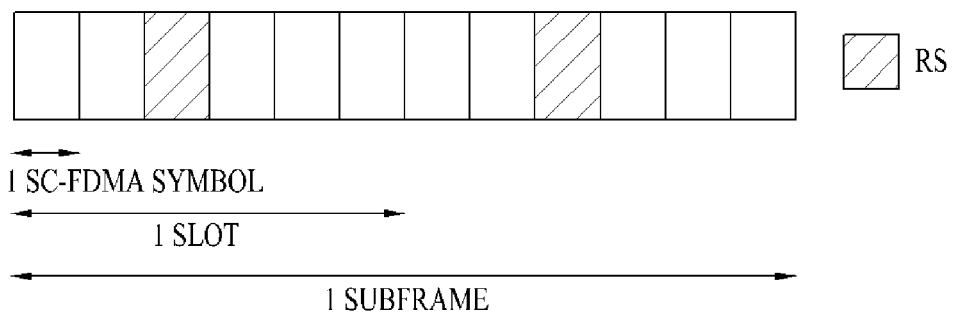

FIG. 8 illustrates the positions of symbols to which RSs are mapped in an SC-FDMA subframe structure. FIG. 8(a) illustrates a case where an RS is positioned in the $4^{th}$ SC-FDMA symbol of each of two slots in a subframe, when a normal CP is used. FIG. 8(b) illustrates a case where an RS is positioned in the $3^{rd}$ SC-FDMA symbol of each of two slots in a subframe, when an extended CP is used.

With reference to FIGS. 9 to 12, clustered DFT-s-OFDMA will be described. Clustered DFT-s-OFDMA is a modification to the above-described SC-FDMA, in which a DFT signal is divided into a plurality of sub-blocks and mapped to positions apart from each other in the frequency domain.

Figure 9:
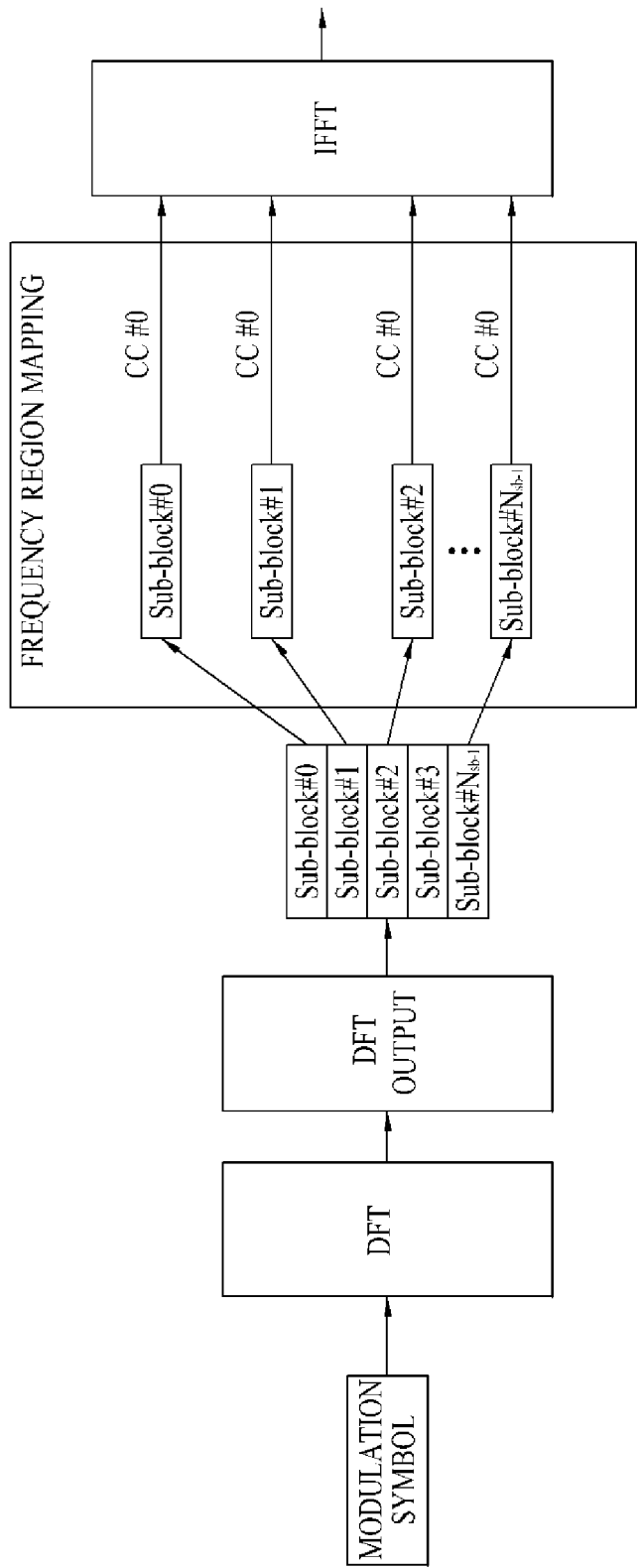
FIG. 9 illustrates a clustered Discrete Frequency Transform-spread-Orthogonal Frequency Division Multiple Access (DFT-s-OFDMA) scheme in a single carrier system.

FIG. 9 illustrates a clustered DFT-s-OFDMA scheme in a single carrier system. For example, a DFT output may be divided in Nsb sub-blocks (sub-block #0 to sub-block #Nsb-1). The sub-blocks, sub-block #0 to sub-block #Nsb-1 are mapped to positions spaced from each other in the frequency domain on a single carrier (e.g. a carrier having a bandwidth of 20 MHz). Each sub-block may be mapped to a frequency area in the localized mapping scheme.

Figure 10:
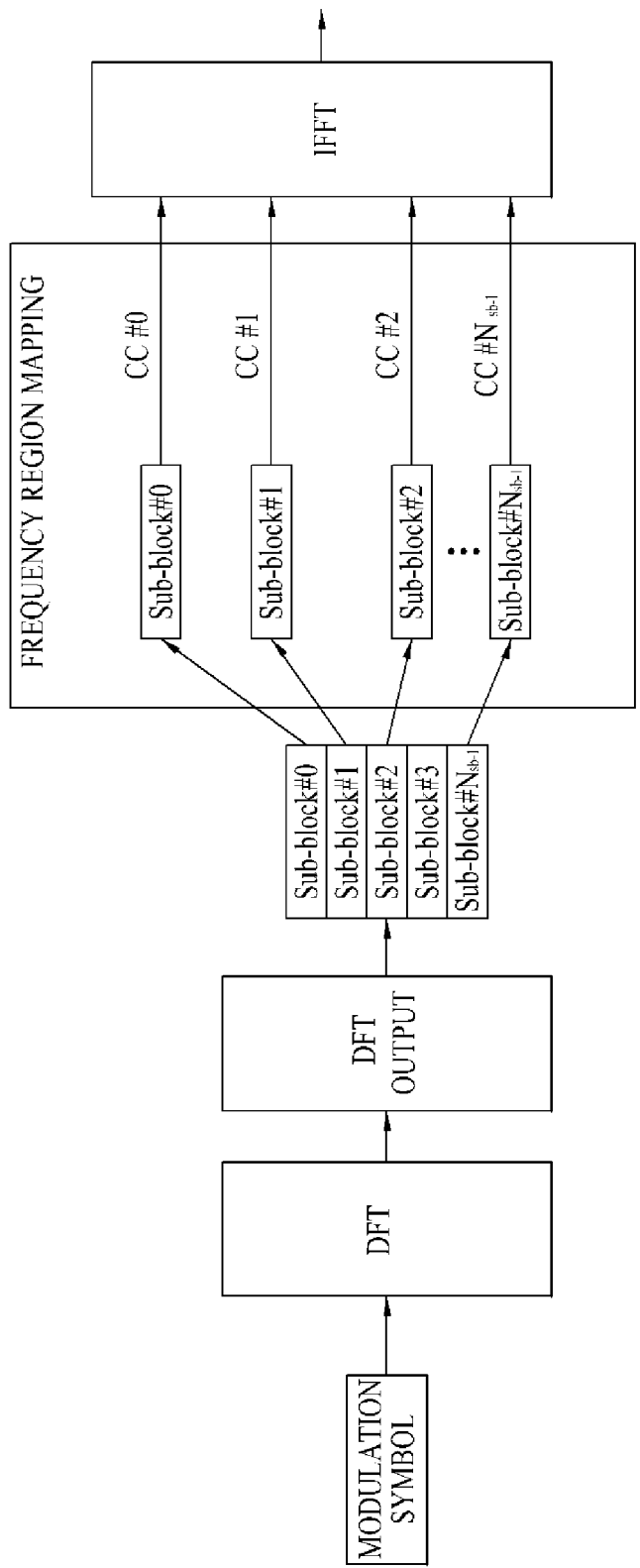
FIGS. 10, 11 and 12 illustrate clustered DFT-s-OFDMA schemes in a multiple antenna system.
Figure 11:
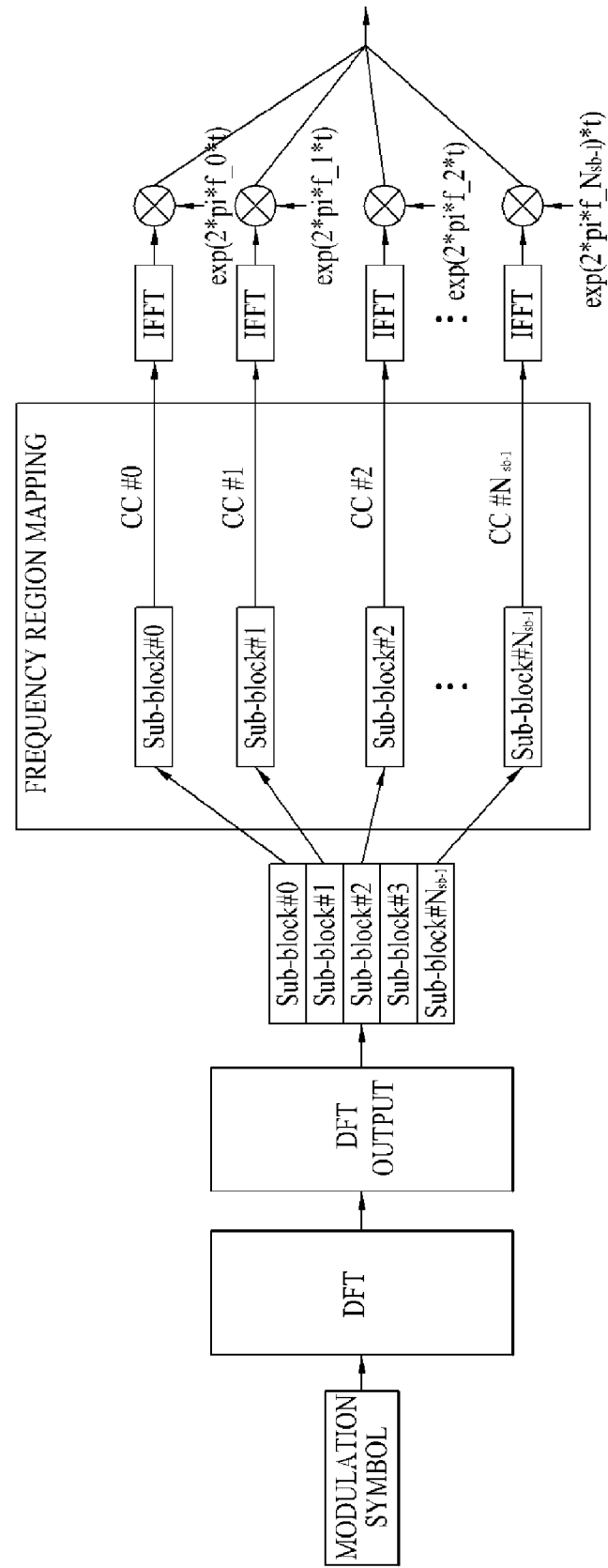

FIGS. 10 and 11 illustrate clustered DFT-s-OFDMA schemes in a multiple antenna system.

FIG. 10 illustrates an example of generating a signal through one IFFT module, when multiple carriers are contiguously configured (i.e. the respective frequency bands of the multiple carriers are contiguous) and a specific subcarrier spacing is aligned between adjacent carriers. For example, a DFT output may be divided into Nsb sub-blocks (sub-block #0 to sub-block #Nsb-1) and the sub-blocks, sub-block #0 to sub-block #Nsb-1 may be mapped, in a one-to-one correspondence, to the component carriers, component carrier #0 to component carrier #Nsb-1 (each component carrier may have, for example, a bandwidth of 20 MHz). Each sub-block may be mapped to a frequency area in the localized mapping scheme. The sub-blocks mapped to the respective component carriers may be converted to a time signal through a single IFFT module.

FIG. 11 illustrates an example of generating signals through a plurality of IFFT modules, when multiple carriers are non-contiguously configured (i.e. the respective frequency bands of the multiple carriers are non-contiguous). For example, a DFT output may be divided into Nsb sub-blocks (sub-block #0 to sub-block #Nsb-1) and the sub-blocks, sub-block #0 to sub-block #Nsb-1 may be mapped, in a one-to-one correspondence, to the component carriers, component carrier #0 to component carrier #Nsb-1 (each component carrier may have, for example, a bandwidth of 20 MHz). Each sub-block may be mapped to a frequency area in the localized mapping scheme. The sub-blocks mapped to the respective component carriers may be converted to time signals through respective IFFT modules.

If the clustered DFT-s-OFDMA scheme for a single carrier illustrated in FIG. 9 is intra-carrier DFT-s-OFDMA, it may be said that the clustered DFT-s-OFDMA schemes for multiple carriers illustrated in FIGS. 10 and 11 are inter-carrier DFT-s-OFDMA. Intra-carrier DFT-s-OFDMA and inter-carrier DFT-s-OFDMA may be used in combination.

Figure 12:
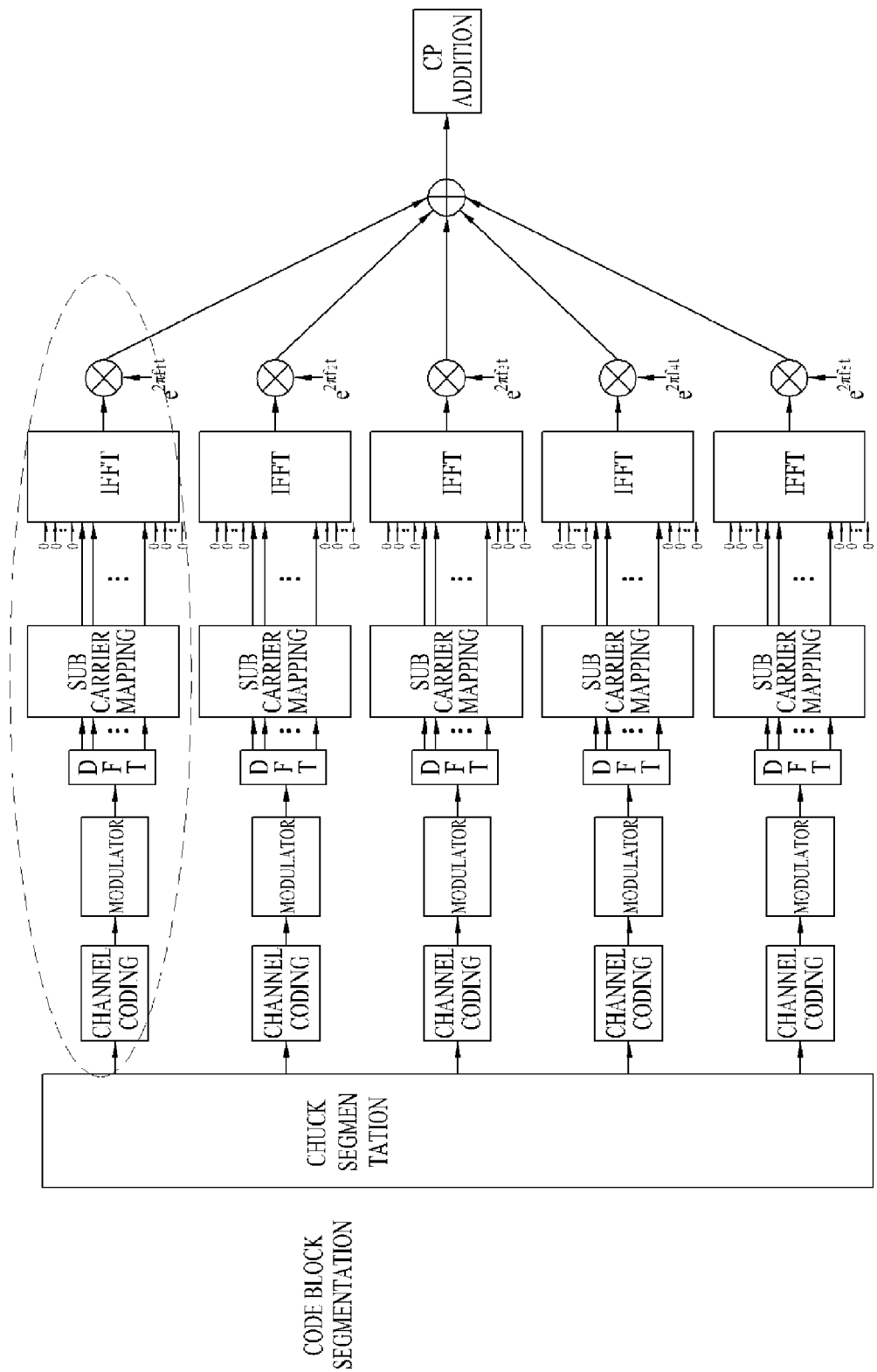

FIG. 12 illustrates a chunk-specific DFT-s-OFDMA scheme in which DFT, frequency mapping, and IFFT are performed on a chunk basis. Chunk-specific DFT-s-OFDMA may also be referred to as Nx SC-FDMA. A code block resulting from code block segmentation is divided into chunks and the chunks are channel-encoded and modulated individually. The modulated signals are subjected to DFT, frequency mapping, and IFFT and the IFFT signals are summed and then added with a CP in the same manner as described with reference to FIG. 5. The Nx SC-FDMA scheme illustrated in FIG. 12 is applicable to both a case of contiguous multiple carriers and a case of non-contiguous multiple carriers.

Carrier Aggregation

Carrier Aggregation (CA) will be described below. A technology for efficiently using small segmented bands, known as CA (bandwidth aggregation) or spectrum aggregation, has been developed in order to aggregate a plurality of physical bands to a logical wider band.

CA was introduced to support increased throughput, prevent a cost increase caused by the use of wideband RF devices, and ensure compatibility with legacy systems. While a legacy wireless communication system (e.g. LTE release 8 or 9) supports transmission and reception on a single carrier having a specific bandwidth, CA enables data exchange between a UE and an eNB on a group of carriers each having a bandwidth unit defined in the legacy wireless communication system. The carriers each having a bandwidth unit defined in the legacy wireless communication system may be called Component Carriers (CCs). For example, CA may support a system bandwidth of up to 100 MHz by aggregating up to 5 CCs each having a bandwidth of 5, 10 or 20 MHz.

Downlink CA may be described as support of an eNB's downlink transmission to a UE using frequency resources (subcarriers or Physical Resource Blocks (PRBs)) of one or more carrier bands in time resources (allocated in units of a subframe). Similarly, uplink CA may be described as support of a UE's uplink transmission to an eNB using frequency resources (subcarriers or PRBs) of one or more carrier bands in time resources (allocated in units of a subframe).

Figure 13:
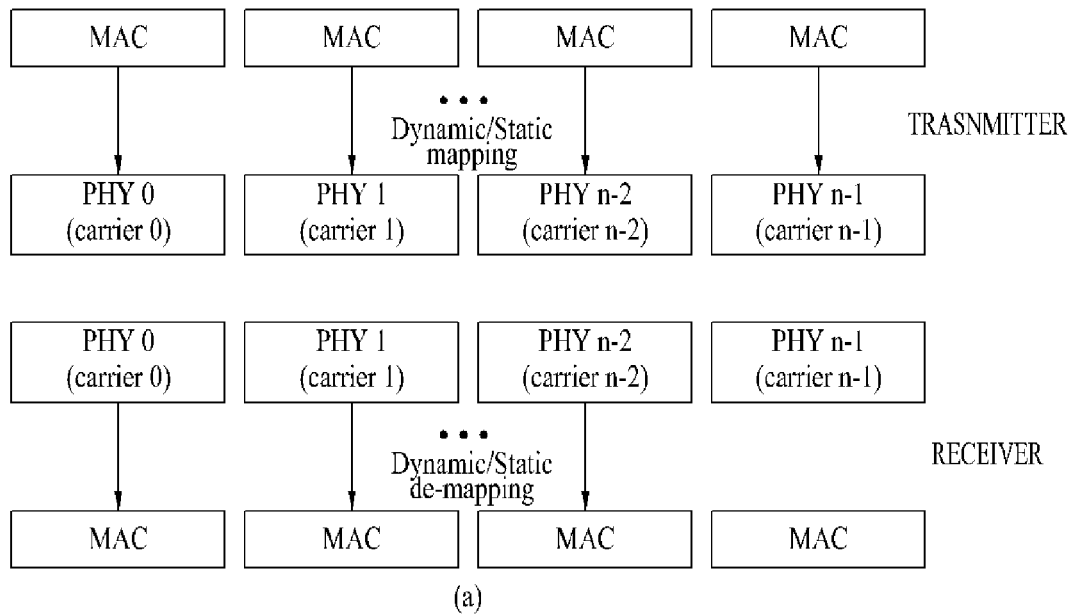
FIG. 13 illustrates the structures of a physical layer (L1) and a Medium Access Control (MAC) layer in a multiple carrier system.
Figure 13:
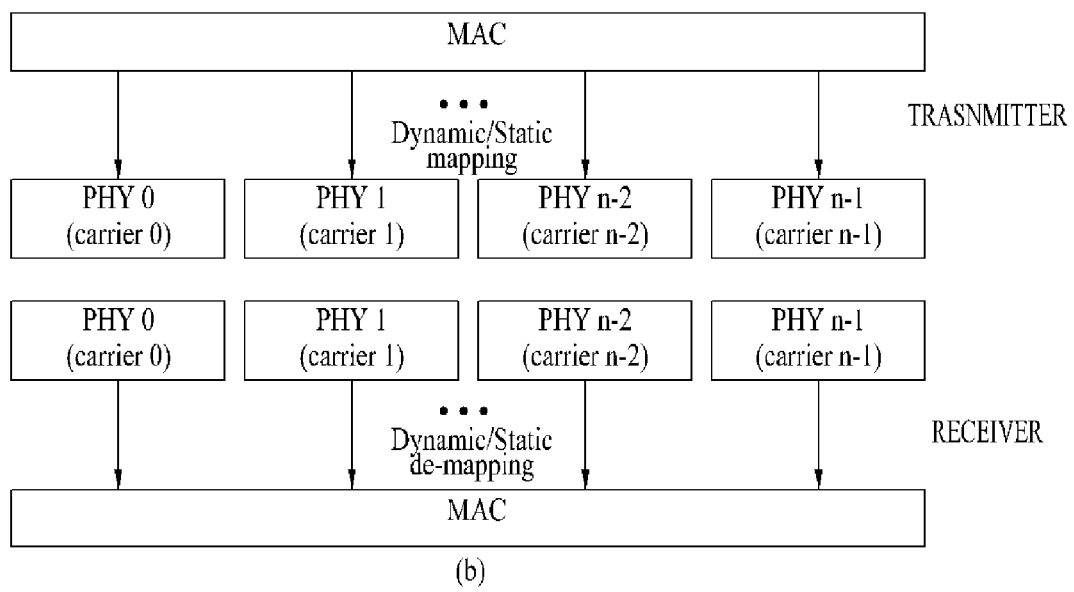

With reference to FIG. 13, the structures of a physical (PHY) layer (Layer 1 or L1) and a Medium Access Control (MAC) layer (Layer 2 or L2) in a multiple carrier system will be described. In a legacy wireless communication system supporting a single carrier, an eNB may have one PHY entity supporting a single carrier and one MAC entity that controls the PHY entity. The PHY entity may perform, for example, baseband processing. The MAC layer may perform, for example, MAC Protocol Data Unit (PDU} generation and L1/L2 scheduling covering a MAC/Radio Link Control (RLC) sublayer in a transmitter. A MAC PDU packet block of the MAC layer is converted to a transport block through a logical transport layer and mapped to a PHY input information block.

Meanwhile, a plurality of MAC-PHY entities may be provided in the multiple carrier system. That is, a transmitter and a receiver may be configured by mapping one MAC-PHY entity to each of n CCs in the multiple carrier system, as illustrated in FIG. 13(a). Since an independent PHY layer and MAC layer are configured for each CC, the PHY layer generates a PDSCH from a MAC PDU on a CC basis.

Alternatively, one common MAC entity and a plurality of PHY entities may be configured in the multiple carrier system. That is, n PHY entities are provided for each of n CCs and one common MAC entity exists for controlling the n PHY entities, as illustrated in FIG. 13(b). In this case, a MAC PDU from one MAC layer may be divided into a plurality of transport blocks one to one mapped to a plurality of CCs in a transport layer. Or the per-CC transport block division may take place during MAC PDU generation in the MAC layer or during RLC PDU generation in the RLC layer. Therefore, a PDSCH is generated per CC in the PHY layer.

PDCCHs carrying control information of L1/L2 control signaling generated from a packet scheduler of the MAC layer may be mapped to the physical resources of individual CCs and then transmitted. Herein, a PDCCH including control information for PDSCH or PUSCH transmission of a specific UE (DownLink (DL) assignment information or UL grant information) may be separately encoded for individual CCs on which a corresponding PDSCH/PUSCH is transmitted. This PDCCH may be referred to as a separately coded PDCCH. On the other hand, control information for PDSCH/PUSCH transmission on a plurality of CCs may be configured into a single PDCCH. This PDCCH may be referred to as a jointly coded PDCCH.

To support CA, a connection is to be established or a connection setup preparation is needed between an eNB and a UE (or a Relay Node (RN)) to transmit a control channel (PDCCH or PUCCH) and/or a shared channel (PUSCH or PUSCH). For the connection/connection setup, the specific UE (or the RN) needs to measure carriers and/or report carrier measurements, and CCs to be measured and/or reported may be assigned to the UE (or the RN). That is, CC assignment means configuring CCs (determining the number and indexes of CCs) for use in downlink/uplink transmission from among downlink/uplink CCs configured by the eNB, taking into account the capability of the specific UE (or the RN) and a system environment.

In the case where a Layer 3 (L3) Radio Resource Management (RRM) controls CC assignment, UE-specific or RN-specific Radio Resource Control (RRC) signaling may be used. Or cell-specific or cell cluster-specific RRC signaling may be used. If CC assignment needs to be dynamically controlled, a specific PDCCH may be used for L1/L2 control signaling, or a physical channel dedicated to CC allocation control information or a PDSCH taking the form of an L2 MAC message may be used. Meanwhile, if the packet scheduler controls CC assignment, a specific PDCCH may be used for L1/L2 control signaling, or a physical channel dedicated to CC allocation control information or a PDSCH taking the form of an L2 MAC message may be used.

Now, transmission modes available for uplink transmission in a wireless communication system conforming to the LTE-A standard will be described below in detail.

For uplink transmission in the LTE-A system, various uplink transmission modes may be defined according to transmission schemes using a plurality of transmission antennas and power amplifiers. While the following description is given in the context of an uplink transmission entity being a UE, it does not exclude uplink transmission from an RN. That is, the following description is also applicable to uplink transmission from an RN.

To demodulate or decode an uplink signal received from a UE or an RN, an eNB needs to perform channel estimation. For channel estimation, DeModulation-Reference Signals (DM-RSs) may be used. A DM-RS may be defined on an antenna port basis. An antenna port may be an individual DM-RS resource distinguishable by a sufficiently low correlation or orthogonality in a DM-RS pattern, that is, in channel estimation. The antenna port may be represented as a DM-RS resource, particularly a DM-RS Cyclic Shift (CS). It is to be noted that an antenna port, a DM-RS resource, and a DM-RS CS are equivalent in their meanings. An orthogonal cover code may be additionally used as a DM-RS resource according to the characteristics of a transmission scheme using a plurality of uplink antennas. Specifically, a DM-RS resource may be identified as a pair of a DM-RS CS and the index of an orthogonal cover code mapped to two DM-RS symbols in any uplink subframe.

Table 1 below illustrates an example of available uplink transmission modes. In Table 1, mode indexes such as Mode 1 to Mode 7 simply identify a plurality of uplink transmission modes, not limited to any specific order. Therefore, the uplink transmission modes may be indexed with other mode indexes. While all of the transmission modes illustrated in Table 1 may be used as uplink transmission modes, it is also possible to select one or more of the transmission modes as actual uplink transmission modes. Different uplink transmission modes may be configured for different UE categories or UE classes.

TABLE 1

| Mode index | Uplink transmission mode |
| --- | --- |
| Mode 1 | Single antenna port transmission mode |
| Mode 2 | Transmission (Tx) diversity using multiple antenna ports |
| Mode 3 | Closed-loop (or channel-dependent) precoding-based spatial multiplexing |
| Mode 4 | Closed-loop (or channel-dependent) single rank precoding transmission |
| Mode 5 | Open-loop (or channel-independent) precoding-based spatial multiplexing |
| Mode 6 | Closed-loop (or channel-dependent) Multi-User Multiple Input Multiple Output (MU-MIMO) transmission |
| Mode 7 | Closed-loop (or channel-dependent) precoding-based dual layer transmission |

Mode 1 is a transmission mode based on the premise that a single antenna port (i.e. a single DMS-RS resource or DM-RS CS) is used. If an uplink transmission entity has a plurality of physical transmission antennas, this transmission mode may be practiced into a transmission scheme using a single virtual antenna through antenna virtualization. Antenna virtualization is a technology of treating signal transmission through a plurality of physical antennas as signal transmission through a single antenna. For example, although the LTE-A system is designed so as to support eight transmission antennas, it may adopt antenna virtualization to simultaneously support an LTE UE that supports up to four transmission antennas. That is, for 4Tx MIMO transmission through eight virtual antennas that are initially configured, RSs are transmitted through four virtual antennas selected from among the eight virtual antennas by antenna virtualization. For this purpose, a cell-specific RS sequence may be mapped to the virtual antennas using a virtual antenna matrix.

In addition, the single antenna port transmission mode may include transmission through a single physical transmission antenna from an uplink transmission entity as is done in the legacy LTE system (e.g. release 8). PDCCH DCI format 0 for a UL grant as defined in the legacy LTE system may be applied to this transmission mode. Or if a DCI format other than DCI format 0 for a UL grant PDCCH as defined in the legacy LTE system is defined for a single antenna transmission situation, this DCI format is applicable to this transmission mode.

Mode 2 may be practiced into a transmission scheme using Tx diversity that can be represented as a precoding matrix based on the premise that an antenna port (i.e. a DM-RS resource or DM-RS CS) is applied to each of one or more physical transmission antennas or each of one or more virtual antennas. Tx diversity schemes that can be represented as a precoding matrix may include, for example, Space Time Block Coding (STBC), modified STBC, Space Frequency Block Coding (SFBC), modified SFBC, short-delay Cyclic Delay Diversity (CDD), long-delay CDD, Precoding Vector Switching (PVS), Frequency Switching Transmit Diversity (FSTD), Spatial Orthogonal Resource Transmit Diversity (SORTD), Spatial Orthogonal Resource Multiplexing (SORM), etc. This transmission mode may be confined to PUCCH transmission, not used for PUSCH transmission.

Mode 3 is a closed-loop precoding-based spatial multiplexing transmission mode in which DM-RSs can be precoded using the same precoder as applied to data transmission symbols, selectively according to a rank or for every rank. Closed-loop precoding may be represented as channel-dependent precoding. Mode 3 may be used for uplink Single User (SU)-MIMO transmission. MIMO is a multiple antenna transmission technology. Mode 3 may be used for MU-MIMO in a situation where the same UL grant is applied between SU-MIMO and MU-MIMO (i.e. UL grant PDCCHs for SU-MIMO and MU-MIMO) are transparent a UE) and the UE performs a precoding-based transmission accordingly. Thus an antenna port (i.e. a DM-RS resource or DM-RS CS) may be allocated on a transmission layer basis. Herein, the indexes of RS transmission resources may be explicitly indicated. Alternatively, one or more reference layers may be determined. Then the indexes of RS resources in these reference layers may be explicitly indicated by a UL grant DCI format, whereas the indexes of RS resources in the remaining layers may be implicitly determined according to offsets or a rule based on a predefined mapping table or mathematical expression. Under this assumption, a cell or an eNB may transmit to a UE a specific codebook for a specific number of transmission layers (i.e. a rank) on a UL grant PDCCH and then the UE may precode data and DM-RSs using the codebook. In this manner, spatial multiplexing may be implemented with a rank (ranging from 1 to N, N is the number of physical UE transmission antennas or the number of physical eNB reception antennas). Mode 4 is applicable for rank 1 to rank 4.

Mode 4 is a closed-loop (or channel-dependent) single rank precoding transmission mode. Mode 4 is available when rank-1 transmission continues in Mode 3. In Mode 3, single codeword-based transmission is applied to rank-1 transmission and two codeword-based transmissions are applied to rank-2 transmission. If rank-1 transmission lasts for a relatively long time in case of an especially high antenna channel correlation, a closed-loop rank-1 transmission mode may be separately defined to thereby reduce overhead. That is, if single codeword-based rank-1 transmission continues, providing information about two codewords may cause unnecessary overhead. Therefore, an additional closed-loop (channel-dependent) rank-1 transmission mode is defined, thus eliminating ambiguity and optimizing a payload size. Mode 4 is based on the premise of a single antenna port (i.e. a single DM-RS resource or DM-RS CS).

Mode 5 is an open-loop precoding-based spatial multiplexing transmission mode. It may be said that open-loop precoding is channel-independent precoding. If a UE transmits an uplink signal in an environment having a medium Doppler frequency and a high geometry in the channel-independent precoding-based spatial multiplexing transmission mode, the UE may overcome nulling on a frequency channel and perform high-rank transmission. To overcome nulling on the channel, random precoding (i.e. a precoder is selected and applied per random resource granularity (e.g. one subcarrier, one PRB (12 subcarriers), or a plurality of PRBs)) or cyclical use of a whole set of codebooks (or a subset of codebooks) per specific resource granularity (e.g. one subcarrier, one PRB (12 subcarriers), or a plurality of PRBs) in a predetermined order may be considered. Basically, a precoder may be used per one or more subcarriers in the frequency domain (e.g. a precoder may be applied in units of one or more PRBs each including 12 subcarriers) in implementing the channel-independent precoding-based spatial multiplexing transmission scheme. Since this scheme may increase an antenna PAPR or CM, a different precoder may be used every specific time unit (one or more DFT-s-OFDM symbols, one 0.5-ms slot including a specific number of symbols, or one 1-ms subframe). The above precoder cycling or precoder randomization in frequency resources or time resources may be used simultaneously. For example, considering that uplink DM-RSs and Sounding Reference Signals (SRSs) in time resources are multiplexed in Time Division Multiplexing (TDM), precoder cycling or precoder randomization may be performed in units of a time resource granularity being one or more 0.5-ms slots. While a precoder may be applied channel-independently in this manner, the cell or eNB may indicate a long-term or short-term uplink transmission rank to be used to the UE by UE-specific RRC signaling or L1/L2 control PDCCH signaling according to the geometry of the cell. Herein, rank 1 may be set basically to the Tx diversity scheme defined in Mode 2. However, precoding cycling or precoder randomization using a rank-1 precoder or long-term channel-dependent precoding may be used due to the number of used DM-RS resources or problems caused by dynamic adaptation between non-continuously distinguished schemes. In the precoding-based transmission scheme of Mode 5, DM-RSs may be precoded using a precoder which is selected in the same manner as in precoder cycling or precoder randomization for data transmission symbols, selectively according to a rank or for every rank. Herein, as many RS resources (e.g. DM-RS CSs) as the number of ranks are assigned. Meanwhile, in order to mitigate restrictions on precoder cycling or precoder randomization caused by DM-RS precoding, as many DM-RSs as the number of physical antennas or virtual antennas may be assigned without precoding, even though precoding is used for data transmission. Such non-precoded DM-RSs may also be used in the case where diversity is implemented in a rank-1 transmission scheme. For instance, in case of long-term channel-dependent precoding as a rank-1 transmission scheme, precoded DM-RSs may be used and a single RS resource (e.g. a single DM-RS CS) may be assigned.

Mode 6 is a closed-loop (or channel-dependent) MU-MIMO transmission mode. Mode 6 may be defined as an optimal transmission mode for enhancing the throughput of a cell, sector or UE on an LTE-A uplink. Compared to the MU-MIMO transmission scheme in Mode 3, the closed-loop (or channel-dependent) MU-MIMO transmission mode may be set through RRC layer configuration and signaling, i.e. higher-layer configuration and signaling. Herein, a DCI format different from DCI formats for other transmission modes may be defined for a UL grant PDCCH. Control parameters may be defined in the payload of the DCI format in order to support optimized MU-MIMO transmission from a UE. For example, a power allocation field may be defined in the DCI format, taking into account the number of streams applied to UEs that are involved in MU-MIMO transmission. In addition, if a precoding mode is used as a transmission scheme of an individual UE involved in the MU-MIMO transmission, fields indicating the total number of streams (the rank of a used precoder) and/or one or more streams may be defined in the DCI format. In this case, the number of antenna ports (i.e. DM-RS resources or DM-RS CSs) for the individual UE may be equal to the number of streams (or layers) that the individual UE transmits. The accurate indexes of RS resources may be indicated explicitly by the DCI format or implicitly based on the above information. Meanwhile, to set the indexes of RS resources in Mode 6, DM-RS resources may be assigned in a similar manner to in Mode 3. That is, DM-RS resources may be assigned on a stream basis in Mode 6 in the same manner as in Mode 3 in which DM-RS resources are assigned on a transmission layer basis, by determining the total number of uplink streams in resources assigned to the UE to be the rank of SU-MIMO (i.e. Mode 3) and treating an individual stream indication assigned to the UE in the DCI format as an SU-MIMO layer index in Mode 3. The terms, transmission layer and transmission stream are interchangeably used in the same meaning.

Mode 7 is a closed-loop (or channel-dependent) precoding-based dual layer transmission mode. Mode 7 is also a unique transmission mode in which when an uplink transmission entity (a UE or an RN) transmits an uplink signal through dual polarized antennas in a high antenna correlation (or Line-Of-Sight (LOS)) situation, rank-2 precoding is used under circumstances (e.g. for the purpose of optimizing control overhead). If a cell or an eNB signals a specific codebook for a specific number of transmission layers (i.e. a rank) to a UE on a UL grant PDCCH, the UE may perform precoding based on the codebook. In this manner, spatial multiplexing may be implemented with a specific rank (ranging from 1 to N, N is the number of physical UE transmission antennas or the number of physical eNB reception antennas).

Figure 14:
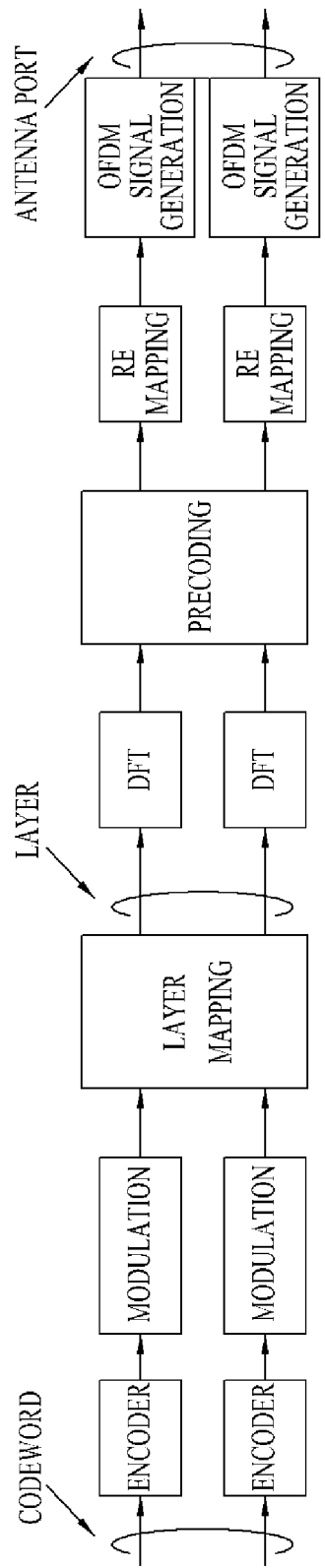
FIG. 14 is a block diagram of a DFT-s-OFDMA uplink transmission structure.

FIG. 14 is a block diagram of a DFT-s-OFDMA (or SC-FDMA) uplink transmission structure that may implement the above-described various transmission modes.

One or more codewords resulting from encoding in an encoder may be scrambled with a UE-specific scrambling signal. The scrambled codewords are modulated to complex symbols in Binary Phase Shift Keying (BPSK), Quadrature Phase Shift Keying (QPSK), 16-ary Quadrature Amplitude Modulation (16QAM), or 64-ary Quadrature Amplitude Modulation (64QAM) according to the type of a transmission signal and/or a channel state. Subsequently, the modulated complex symbols are mapped to one or more layers. If the signal is transmitted through a single antenna, one codeword is mapped to one layer, for transmission. On the other hand, if the signal is transmitted through multiple antennas, codewords may be mapped to layers in the following relationships illustrated in Table 2 and Table 3 according to transmission schemes.

TABLE 2

| Number of layers | Number of code words | Codeword-to-layer mapping $i = 0, 1, \ldots, M_{symb}^{layer} - 1$ |
|---|---|---|
| 1 | 1 | $x^{(0)}(i) = d^{(0)}(i)$ $M_{symb}^{layer} = M_{symb}^{(0)}$ |
| 2 | 2 | $x^{(0)}(i) = d^{(0)}(i)$ $M_{symb}^{layer} = M_{symb}^{(0)} = M_{symb}^{(1)}$ $x^{(1)}(i) = d^{(1)}(i)$ |
| 2 | 1 | $x^{(0)}(i) = d^{(0)}(2i)$ $M_{symb}^{layer} = M_{symb}^{(0)}/2$ $x^{(1)}(i) = d^{(1)}(2i + 1)$ |
| 3 | 2 | $x^{(0)}(i) = d^{(0)}(i)$ $M_{symb}^{layer} = M_{symb}^{(0)} = M_{symb}^{(1)}/2$ $x^{(1)}(i) = d^{(1)}(2i)$ $x^{(2)}(i) = d^{(1)}(2i + 1)$ |
| 4 | 2 | $x^{(0)}(i) = d^{(0)}(2i)$ $M_{symb}^{layer} = M_{symb}^{(0)}/2 = M_{symb}^{(1)}/2$ $x^{(1)}(i) = d^{(0)}(2i + 1)$ $x^{(2)}(i) = d^{(1)}(2i)$ $x^{(3)}(i) = d^{(1)}(2i + 1)$ |

TABLE 3

| Number of layers | Number of code words | Codeword-to-layer mapping $i = 0, 1, \ldots, M_{symb}^{layer} - 1$ |
|---|---|---|
| 2 | 1 | $x^{(0)}(i) = d^{(0)}(2i)$ $x^{(1)}(i) = d^{(0)}(2i + 1)$ $M_{symb}^{layer} = M_{symb}^{(0)}/2$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ $M_{symb}^{layer} = \begin{cases} M_{symb}^{(0)}/4 & \text{if } M_{symb}^{(0)} \bmod 4 = 0 \\ (M_{symb}^{(0)} + 2)/4 & \text{if } M_{symb}^{(0)} \bmod 4 \neq 0 \end{cases}$ If $M_{symb}^{(0)} \bmod 4 \neq 0$ two null symbols shall be appended to $d^{(0)}(M_{symb}^{(0)} - 1)$ |

Table 2 illustrates codeword-to-layer mapping relationships in case of spatial multiplexing and Table 3 illustrates codeword-to-layer mapping relationships in case of Tx diversity. In Table 2 and Table 3, $x^{(a)}(i)$ denotes an $i^{th}$ symbol for a layer with index a and $d^{(a)}(i)$ denotes an $i^{th}$ symbol of a codeword with index a. The mapping relationship between the number of codewords and the number of layers may be known from "Number of layers" and "Number of codewords" and "Codeword-to-Layer mapping" indicates how the symbols of each codeword are mapped to layers.

As noted from Table 2 and Table 3, one codeword may be mapped to one layer on a symbol basis. In contrast, one codeword may be mapped across up to four layers as illustrated in the second case of Table 3. It is noted that if one codeword is distributed to a plurality of layers, the symbols of the codeword are mapped sequentially to the respective layers. Meanwhile, only one encoder and one modulation block are used in case of single codeword-based transmission.

The layer signals may be subjected to transform precoding. Specifically, the layer signals may be precoded by DFT, multiplied by a specific precoding matrix selected according to a channel state, and allocated to respective transmission antennas. Each of the resulting antenna-specific transmission signals may be mapped to time-frequency REs allocated for transmission and then transmitted through OFDM signal generators and the antennas.

While not shown in FIG. 14, layer shifting (or layer permutation) may be performed additionally. Layer shifting may precede DFT processing or follow DFT processing or OFDM signal generation. Or the layer shifting may be performed on a symbol or slot basis in the time domain. However, layer shifting is not always performed and may be excluded from an uplink transmission mechanism.

The uplink transmission structure illustrated in FIG. 14 may be used for 2Tx antenna transmission, in case of per-rank codeword-to-layer mapping of uplink precoding-based SU-MIMO in an LTE-A system associated with Mode 3 and Mode 4 illustrated in Table 1.

The uplink transmission modes listed in Table 1 are candidates available for the LTE-A system. All or part of the uplink transmission modes may be used depending on the specific design of the LTE-A system. In Table 1, for example, Mode 4 may be excluded because it can be implemented using Mode 3, and Mode 5 and Mode 7 may not be implemented to reduce system complexity. Then, the entire uplink transmission modes for LTE-A UEs may include Mode 1, Mode 2, Mode 3 and Mode 6 in Table 1. Or if Mode 3 and Mode 4 are configured as separate transmission modes due to their different DCI formats for a UL grant PDCCH (e.g. different bit-widths for a DM-RS CS field), the entire uplink transmission modes for LTE-A UEs may include Mode 1, Mode 2, Mode 3, Mode 4, and Mode 6 in Table 1. Additionally, the entire uplink transmission modes for LTE-A UEs may be set to Mode 1, Mode 2, Mode 3 and Mode 4 of Table 1 to reduce system complexity by not defining the uplink MU-MIMO transmission mode additionally. In another example, Mode 1, Mode 3 and Mode 4 may form the entire uplink transmission modes for LTE-A UEs by excluding the Tx diversity mode requiring as many DM-RS resources (i.e. antenna ports or DM-RS CSs) as the number of physical antennas at a UE and adopting the single-rank transmission mode to reduce the overhead of UL grant PDCCHs. Especially when the MU-MIMO transmission mode is introduced for optimized support of uplink MU-MIMO, Mode 1, Mode 3, Mode 4 and Mode 6 of Table 1 may be selected.

Different combinations of uplink transmission modes may be produced according to capabilities corresponding to the classes of uplink transmission entities (UEs or RNs). In addition, different uplink transmission modes may be set for LTE UEs, LTE-A UEs, and RNs that are considered as uplink transmission entities.

A higher layer may configure basic uplink transmission modes for a UE (or an RN) semi-statically by UE-specific (or RN-specific) RRC signaling. Obviously, a cell or an eNB (or an RN as an uplink reception entity) may change or override the transmission modes for uplink transmission entities semi-statically through a UE-common (or RN-common) PDCCH. Or one or more transmission modes may be dynamically adapted without changing a UL grant PDCCH DCI format associated with an existing transmission mode. For example, a state may be defined in a Transmit Precoding Matrix Indicator (TPMI) field of a DCI format, which indicates that an LTE-A uplink transmission entity (a UE or an RN) is supposed to switch from a precoding-based transmission mode to a Tx diversity mode for an LTE-A uplink reception entity (a cell, eNB or RN), while the DCI format of the precoding-based transmission mode is maintained.

Specific methods for configuring and applying uplink transmission modes, methods for configuring DM-RSs, methods for control signaling in uplink transmission schemes, and methods for configuring transmission modes in the case where an uplink control signal is transmitted on a PUSCH will be described below based on the aforedescribed uplink transmission modes and uplink transmission signal generation structure in the LTE-A system.

Closed-Loop Rank-1 Precoding-Based Transmission and Closed-Loop Rank-2 Precoding-Based Transmission A description will be given of a method for separately applying a closed-loop rank-1 precoding-based transmission mode (Mode 4 in Table 1) and a closed-loop rank-2 (dual-layer) precoding-based transmission mode (Mode 7 in Table 1) for LTE-A uplink transmission.

Basically, a rank-1 precoding-based transmission mechanism may be implemented in Mode 3 illustrated in Table 1. In addition, a cell or an eNB (or an RN as an uplink reception entity) may receive a Channel Quality Indicator (CQI), a Precoding Matrix Indicator (PMI), and a Rank Indicator (RI) from a UE (or an RN as an uplink transmission entity), may acquire measurements based on the received CQI, PMI, and RI and then may indicate a Modulation and Coding Scheme (MCS) and a TPMI as a transmission scheme to the UE through a UL grant PDCCH. That is, there may exist no need for additionally defining a transmission mode such as Mode 4 of Table 1.

However, defining the rank-1 precoding-based transmission mode (Mode 4 in Table 1) as a unique transmission mode may be useful in a situation where increased reliability of PDCCH transmission is pursued through DCI format optimization and rank-1 precoding-based transmission is set for each UE as a transmission mode for uplink MU-MIMO (or virtual MIMO).

Mode 3 and Mode 4 of Table 1 may be distinguished from each other by means of different DCI formats because a DM-RS transmission resource indication field may be defined differently for rank 1 and rank 2 or higher, in allocating uplink DM-RS transmission resources (e.g. DM-RS CSs) through a UL grant PDCCH DCI format in the precoding-based transmission modes.

A similar advantage to that resulting from additionally defining Mode 4 of Table 1 may be achieved by additionally defining Mode 7 of Table 1 (the rank-2 precoding-based transmission mode). Furthermore, Mode 7 is also advantageous in that the dual-layer transmission mode defined by the legacy LTE standard (release 9) is still used.

Mode Adaptation Between Precoding-Based Transmission Mode and Tx Diversity Mode

In relation to mode adaptation between the precoding-based transmission modes and the Tx diversity mode for LTE-A uplink transmission, there is a need for a method for assigning DM-RS transmission resources, taking into account the difference between the two types of transmission modes in terms of how the number of antenna ports is determined.

More specifically, while DM-RSs are precoded and the number of DM-RS resources (i.e. the number of antenna ports) is determined according to the number of transmission layers (i.e. a rank) in the precoding-based transmission modes, the number of DM-RS resources (i.e. the number of antenna ports) is determined according to the number of physical antennas in the Tx diversity mode. In this context, the present invention proposes a method for indicating DM-RS resources (e.g. DM-RS CSs) and a method for assigning DM-RS transmission resources, for mode adaptation between the above two types of transmission modes on a UL grant PDCCH DCI format.

If an uplink transmission entity (a UE or an RN) includes a plurality of transmission antennas and a plurality of power amplifiers in the LTE-A system, the uplink transmission entity may operate in the (channel-dependent or channel-independent) precoding-based transmission mode and the Tx diversity mode. For mode adaptation between the two types of uplink transmission modes, a semi-static RRC signaling scheme and a dynamic mode adaptation scheme may be considered. In the dynamic mode adaptation scheme, a scheduler of an uplink reception entity (a cell, an eNB, or an RN) may directly change a mode fast and adaptively without RRC signaling.

In the RRC signaling scheme, the cell or eNB (or the RN as the uplink reception entity) may use different PDCCH DCI formats that are uniquely predefined for uplink transmission modes and assign different RS transmission resources in the precoding-based transmission mode and the Tx diversity mode according to the PDCCH DCI formats. More specifically, RS resources may be assigned to each transmission layer according to a transmission rank, on the premise of precoding for RS transmission in the precoding-based transmission mode. Meanwhile, precoding is not considered and RS resources may be assigned to individual physical antennas (or virtual antennas in case of antenna virtualization) in the Tx diversity mode. The uplink transmission entity may interpret adaptation between different signaling schemes for the two types of transmission modes, without ambiguity by means of DCI formats as UL grant messages specific to the individual uplink transmission modes.

On the other hand, if the precoding-based transmission mode is dynamically switched to the Tx diversity mode, that is, in the case of fall-back, the UL grant DCI format needs to be kept unchanged. The transmission mode fall-back means that an eNB commands dynamic transmission mode switching to an uplink transmission entity for the reasons of a rapid change in an uplink channel measured by the eNB, an error in channel measurement, etc. The transmission mode fall-back may mostly refer to switching to a more robust transmission mode. In the case of fall-back to the Tx diversity mode, a field indicating RS resources (e.g. a DM-RS CS) for uplink DM-RS assignment in the same DCI format needs to be interpreted differently.

The same description is applicable to dynamic fall-back from the precoding-based transmission mode to the single antenna port transmission mode. That is, the following methods for mode adaptation between the precoding-based transmission mode and the Tx diversity mode are also applicable to mode adaptation between the precoding-based transmission mode and the single antenna port transmission mode.

For mode adaptation between the precoding-based transmission mode and the Tx diversity mode, methods for defining a field indicating DM-RS transmission resources (e.g. determining a field size) in a DCI format, methods for assigning required DM-RS transmission resources, and methods for configuring uplink transmission modes based on the methods are given as follows.

Method A

In Method A, a 3-bit indication field is defined in a DCI format in order to indicate DM-RS resources (e.g. DM-RS CSs) irrespective of transmission modes.

Basically, a DM-RS resource indication field is set in 3 bits in associated DCI formats irrespective of transmission modes. The DM-RS resource indication field may explicitly indicate the index of one reference DM-RS resource (e.g. a DM-RS CS) from among the indexes of N DM-RS resources required according to a transmission mode, whereas the indexes of the remaining (N−1) DM-RS resources may be determined according to a predefined rule using the explicitly indicated index of the reference DM-RS resource.

To be more specific, the predefined rule may be given as follows. For example, the indexes of the (N−1) DM-RS resources may be selected from a given set of DM-RS resource indexes cyclically in a predetermined order according to offsets predefined with respect to the index of the reference DM-RS resource (the offsets may be preset and shared between the uplink transmission entity and the uplink reception entity). Or a specific table may be preset and shared between the uplink transmission entity and the uplink reception entity, which lists DM-RS resource indexes according to numbers of required DM-RS resources or transmission modes, and a CI format may be configured such that a DM-RS resource index value set in it indicates not only a DM-RS resource explicitly but also an index in the specific table. In this manner, the indexes of the total N DM-RS resources may be determined. Or, DM-RS subsets to which the indexes of DM-RS transmission resources are mapped according to ranks are predefined, instead of directly indicating the index of a substantial reference DM-RS resource. Then, the DM-RS resource indication field may be set to indicate a specific number of DM-RS subsets in the table.

Method A is advantageous in that DM-RS resource (e.g. DM-RS CS) indication fields in UL grant DCI formats have the same size and the indexes of DM-RS resources are indicated using the DM-RS resource indication fields in the same manner irrespective of what specific transmission schemes are used in any transmission modes, on the part of an uplink transmission entity having multiple antennas and power amplifiers. For example, a uniform DCI format field may be defined and a uniform DM-RS resource index setting method may be used for all of the rank-2 precoding-based transmission mode (Mode 4 in Table 1) and the single antenna transmission mode (Mode 1 in Table 1) which require one DM-RS resource, the full-rank precoding-based transmission mode (Mode 3 or Mode 5 in Table 1) requiring as many DM-RS resources as the number of physical antennas at the uplink transmission entity, and the Tx diversity mode (Mode 2 in Table 1).

In Method A, the 3-bit DM-RS resource indication field may be configured using a DM-RS resource indication field defined in the legacy LET system (release 8 or 9), $n_{DMRS}^{(2)}$.

Method B

In Method B, the DM-RS resource indication field is P (P>3) bits long in a UL grant PDCCH DCI format according to a transmission mode.

P-bit DM-RS resource (e.g. DM-RS CS) indication fields (P>3) may be defined in UL grant PDCCH DCI formats associated with all or any of uplink transmission modes applied to an LTE-A uplink transmission entity (a UE or an RN). The size of the DM-RS resource indication field and the indexes of DM-RS resources may be determined in the following specific methods.

Method B-1

In the case where total N (N≥2) DM-RS resources are to be assigned, the DM-RS resource indication field may be 5 bits long in all DCI formats in order to explicitly indicate two DM-RS transmission resources. The index of a reference DM-RS resource may be set using 8 states (or 3 bits) with a full degree of freedom and the index of the other DM-RS resource may be set using 4 states (or 2 bits), in the form of a cyclic difference (a delta value) from the index of the reference DM-RS resource in a total DM-RS transmission resource index set. The 4 states (or 2 bits) used to set the index of the second DM-RS resource may be index differences in one direction (in an increasing index direction or a decreasing index direction) from the index of the reference DM-RS transmission resource, or index differences of up to 2 in both directions from the index of the reference DM-RS transmission resource.

Method B-2

In the case where total N (N≥2) DM-RS resources are to be assigned, the DM-RS resource indication field may be 6 bits long in all DCI formats in order to explicitly indicate two DM-RS transmission resources. The indexes of two reference DM-RS resources may be set separately using 8 states (or 3 bits) with a full degree of freedom.

Method B-3

In the case where total N (N≥2) DM-RS resources are to be assigned, the DM-RS resource indication field may be set to be 6 bits long in all DCI formats in order to explicitly indicate two DM-RS transmission resources. The index of one reference DM-RS resource may be set using 8 states (or 3 bits) with a full degree of freedom and the index of the other DM-RS resource may be set using 8 states (or 3 bits), in the form of a cyclic difference (a delta value) from the index of the reference DM-RS resource in a total DM-RS transmission resource index set. The 8 states (or 3 bits) used to set the index of the second DM-RS resource may be index differences in one direction (in an increasing index direction or a decreasing index direction) from the index of the reference DM-RS resource, or index differences of up to 4 in both directions from the index of the reference DM-RS resource.

Method B-4

In the case where total N (N≥2) DM-RS resources are to be assigned, the DM-RS resource indication field may be set to be 3×N bits long in all DCI formats in order to explicitly indicate two DM-RS transmission resources. The indexes of N reference DM-RS resources may be set individually using 8 states (or 3 bits) with a full degree of freedom. Herein, a DCI format size varies depending on a rank value and thus a method for preventing the resulting PDCCH blind decoding is required. For this purpose, a method for encoding an RI field or a TPMI field separately from a main DCI format and then multiplexing them on a UL grant PDCCH, a method for fixing a field size according to a maximum size of the DM-RS transmission resource indication field, etc. may be considered.

In the above-described Method B-1, Method B-2, and Method B-3, one or more of the remaining N−2 DM-RS transmission resources may be implicitly indicated in a predetermined rule (e.g. cyclic offsets, an equation, or a table) using the explicitly indicated two reference DM-RS resources according to the configuration of a physical antenna (or virtual antenna) transmission unit and a rank value. For example, in case of a 4Tx antenna rank-4 precoding-based transmission mode, the indexes of DM-RS resources are determined implicitly according to the above-described predetermined rule using the explicitly indicated indexes of two DM-RS resources, thereby determining the indexes of total four DM-RS transmission resources. In case of a 4Tx antenna rank-3 precoding-based transmission mode, the index of a DM-RS resource is determined implicitly according to the above-described predetermined rule using one (a higher or lower index) of the explicitly indicated indexes of two DM-RS resources, thereby determining the indexes of total three DM-RS transmission resources.

Considering that Method B is based on the premise that at least two DM-RS transmission resources (e.g. DM-RS CSs) are explicitly indicated by a UL grant PDCCH DCI format, required DM-RS resources may be explicitly indicated for any transmission mode illustrated in Table 1, only if an uplink transmission entity (a UE or an RN) has two physical antennas (or virtual antennas). On the other hand, if the uplink transmission entity includes four physical antennas (or virtual antennas), the indexes of up to two DM-RS transmission resources may be explicitly indicated and the indexes of the remaining DM-RS transmission resources may be implicitly indicated according to the afore-described predetermined rule, for all or part of the uplink transmission modes listed in Table 1.

With regard to Method 1 and Method B described above, a DM-RS transmission resource indication field size and a DM-RS transmission resource assigning method may be adaptively (i.e. differently under circumstances) selected according to a transmission mode of an uplink transmission entity (an LTE UE, an LTE-A UE, or an RN), when uplink DM-RS transmission resources (e.g. DM-RS CSs) are assigned. For example, the uplink transmission entity may adopt the DM-RS indication scheme using the 3-bit indication field and the DM-RS transmission resource assigning scheme as specified in Method A for Mode 1 (the single antenna transmission mode) and Mode 2 (the Tx diversity mode) in Table 1, and the DM-RS indication scheme using the P-bit (P>3) indication field and the DM-RS transmission resource assigning scheme as specified in Method B for the remaining available transmission modes. Or the uplink transmission entity may adopt the DM-RS indication scheme using the 3-bit indication field and the DM-RS transmission resource assigning scheme as specified in Method A for Mode 1 (the single antenna transmission mode), Mode 2 (the Tx diversity mode), and Mode 4 (the rank-1 precoding-based transmission mode) in Table 1, and the DM-RS indication scheme using the P-bit (P>3) indication field and the DM-RS transmission resource assigning scheme as specified in Method B for the remaining available transmission modes.

Even for the same transmission mode, different sizes may be used for the DM-RS transmission resource indication field of a UL grant PDCCH DCI format and different DM-RS transmission resource assigning schemes may be applied in a case where the transmission mode is configured by a higher layer through uplink transmission entity (UE or RN)-specific RRC signaling and a case where the transmission mode is dynamically adapted through L1/L2 PDCCH control signaling. For example, if the higher layer configures a transmission mode in Table 1 through UE-specific (or RN-specific) RRC signaling, the DM-RS indication scheme and the DM-RS transmission resource assigning scheme as specified in Method A may be used for Mode 1 (the single antenna transmission mode) or the Tx diversity mode and the DM-RS indication scheme and the DM-RS transmission resource assigning scheme as specified in Method B may be used for all or part of the precoding-based transmission modes (e.g. Mode 3 to Mode 7 in Table 1). In this situation, it may occur that a precoding-based transmission mode performed in Method B is dynamically switched to the Tx diversity mode (or the single antenna transmission mode) using a TPMI or any explicit indication field although the DCI format is kept unchanged. The dynamic switching from the precoding-based transmission mode to the Tx diversity mode may occur due to introduction of fall-back mode, power allocation-associated overriding of an uplink reception entity (a cell, eNB or RN), etc. Different DM-RS indication schemes and different DM-RS transmission resource assigning schemes may be used for the Tx diversity mode configured by the higher layer through RRC signaling and the Tx diversity mode dynamically configured by fall-back, even though they are the same Tx diversity modes. Accordingly, the system should distinguish a transmission mode configured by RRC signaling from a transmission mode dynamically configured by L1/L2 control signaling.

Open-Loop (Channel-Independent) Spatial Multiplexing Transmission Mode and Open-Loop (Channel-Independent) Rank-1 Transmission Mode The present invention specifies an open-loop rank-1 transmission mode and proposes transmission mode adaptation, in the case where an open-loop spatial multiplexing transmission mode is defined for uplink transmission in the LTE-A system.

An LTE-A uplink transmission entity (an LTE-A UE or an RN) may need to operate in a channel-independent (or open-loop) transmission mode using a plurality of power amplifiers in a channel state having a high Doppler frequency or a channel state having a medium Doppler frequency and a high geometry, relative to a single antenna transmission mode using a single power amplifier or an antenna selective transmission mode as defined in the legacy LTE (release 8 or 9) system. The Tx diversity mode and Mode 5 of Table 1 (the channel-independent (open-loop) precoding-based rank-1 or spatial multiplexing transmission mode) may be considered as plural power amplifier-based channel-independent (open-loop) transmission modes. Both or either of the transmission modes may be configured for all or part of uplink transmission entities according to the defined classes of LTE-A uplink transmission entities (or UE categories representing UE capabilities). In the latter case, especially one of the Tx diversity mode and the channel-independent rank-1 precoding-based transmission mode may be selected. While the Tx diversity mode requires assignment of at least two DM-RS transmission resources (e.g. DM-RS CSs) for 2Tx or 4Tx physical antennas (or virtual antennas), the channel-independent rank-1 precoding-based transmission mode requires assignment of one DM-RS resource irrespective of the configuration of transmission antennas. If beams are appropriately formed, making use of the advantages of the channel-independent rank-1 precoding transmission mode in terms of beamforming gain and power allocation during channel estimation in a channel environment where a correlation is high between antennas, the channel-independent rank-1 precoding-based transmission mode may offer a link transmission gain, compared to the Tx diversity mode. Based on this premise, the channel-independent rank-1 precoding-based transmission mode may be uniquely applied based on long-term precoding and further substitute for the Tx diversity mode, thereby being included in a transmission mode configuration for LTE-A uplink transmission entities, in a relatively low Doppler frequency environment. In other words, the channel-independent rank-1 precoding-based transmission mode is used instead of the Tx diversity mode for uplink multiple antenna transmission in a high Doppler frequency environment, whereas the channel-independent rank-1 precoding-based transmission mode based on long-term precoding, the closed-loop (channel-dependent) precoding-based transmission mode, and the single antenna precoding-based transmission mode may be configured in a low Doppler frequency environment.

Method A is available to adaptive configuration of the channel-independent spatial multiplexing transmission mode and the channel-independent rank-1 transmission mode. That is, irrespective of the spatial multiplexing transmission mode and the rank-1 transmission mode, the DM-RS resource indication field of a UL grant PDCCH DCI format may be configured in 3 bits, and the index of one DM-RS resource may be explicitly indicated, whereas the indexes of the remaining DM-RS resources that may be needed for a specific transmission mode (i.e. in case of spatial multiplexing) may be determined in a predetermined rule. In addition, an eNB may basically notify a UE of a transmission precoder for long-term precoding by transmitting a TPMI on a UL grant PDCCH applied to the corresponding transmission mode. On the other hand, to reduce PDCCH overhead, the eNB may signal a TPMI or parameters (e.g. an MCS, a rank, etc.) indicating transmission details including the TPMI to the UE, semi-statically by UE-specific RRC signaling.

Uplink MU-MIMO Transmission for Optimizing Uplink Throughput

An uplink MU-MIMO transmission scheme is required to increase the average uplink spectral efficiency of a cell, that is, an uplink throughput in the LTE-A system. The uplink throughput may be considered in terms of a cell average throughput and a throughput per cell-edge UE. The present invention defines this uplink MU-MIMO transmission scheme and proposes a transmission mode for optimizing uplink throughput and a downlink control signaling method for a UL grant or other uplink transmission schemes.

The uplink MU-MIMO transmission scheme is a separately defined transmission mode for an LTE-A uplink transmission entity (a UE or an RN), in which a control information field (e.g. an MU-MIMO-specific power allocation indication, etc.) is added to a UL grant PDCCH DCI format for the purpose of performance optimization as described before regarding Mode 6 of Table 1. The uplink MU-MIMO transmission mode may be included in LTE-A uplink transmission modes. This means that Mode 6 of Table 1 is included in the uplink transmission mode configuration. However, if the advantage of the uplink MU-MIMO transmission mode is not achieved, the uplink MU-MIMO transmission mode is not defined separately in order to reduce system complexity. Rather, a UL grant PDCCH DCI format may be used for individual uplink transmission entities, implicitly as a transmission mode different from the conventional MU-MIMO (i.e. SU-MIMO on the part of the uplink transmission entity). This is described in Mode 3 of Table 1. Even though the latter is applied, an uplink transmission schemer may additionally transmit specific control information in a UL grant PDCCH DCI format of a transmission mode applicable to an individual uplink transmission entity, for optimized uplink transmission in MU-MIMO. The specific control information may include, for example, pairing indication information indicating the existence of another UE participating in uplink MU-MIMO transmission or stream indication information indicating a stream that a specific UE is supposed to use in the uplink MU-MIMO transmission.

In the above two uplink MU-MIMO transmission mode configurations and related UL grant PDCCH DCI format configurations, if the scheduler pairs uplink transmission entities, the transmission mode of the individual UEs may be a specific precoding-based transmission mode. In this case, if an uplink codebook is not designed to satisfy a nested property for a lower rank on a rank basis (i.e. the property of defining a precoding matrix for a lower rank as a combination of specific subsets of column vectors in a precoding matrix for a higher rank), an uplink reception entity (a cell, an eNB, or an RN) that receives signals from the paired uplink transmission entities may experience degraded reception performance. To prevent the reception performance degradation, a new field may be additionally defined in a UL grant PDCCH DCI format. Specifically, while the afore-described separately defined MU-MIMO dedicated transmission mode or the conventional precoding-based transmission mode is applied to uplink transmission entities paired in the same physical resources, a rank may be calculated for entire paired transmission streams (i.e. transmission layers), a PMI corresponding to the rank may be set as a TPMI, and a field indicating a column vector, that is, a stream vector for use in transmission according to the TPMI for each individual uplink transmission entity may be added to an associated UL grant PDCCH DCI format. For example, a rank-4 codebook is assigned to an uplink transmission entity that will transmit an uplink signal with rank 1 and the uplink transmission entity may be commanded to use a specific one stream vector of the rank-4 codebook. Instead of being indicated explicitly, the column vector, that is, the stream vector may be indicated indirectly based on the DM-RS resource (i.e. antenna port or DM-RS CS) indication field and an additional rule. In this case, additional control information indicating DM-RS resources that a corresponding UE is supposed to use among DM-RS resources assigned according to paired streams may also be signaled on the UL grant PDCCH.

Transmission Mode that Multiplexes Uplink Control Information by Piggyback in Case of Uplink PUSCH Transmission in Precoding-Based Transmission Mode The present invention proposes a transmission mode configuring method in a case where when an uplink transmission entity (an LTE-A UE or an RN) transmits uplink data on a PUSCH in a precoding-based transmission mode, it multiplexes the uplink data with Uplink Control Information (UCI) by piggyback or multiplexes the uplink data with the UCI according to a Channel Status Information (CSI) feedback mode. The UCI may include an ACK/NACK, an RI, and CSI. The CSI may include, for example, a CQI and a PMI.

Figure 15:
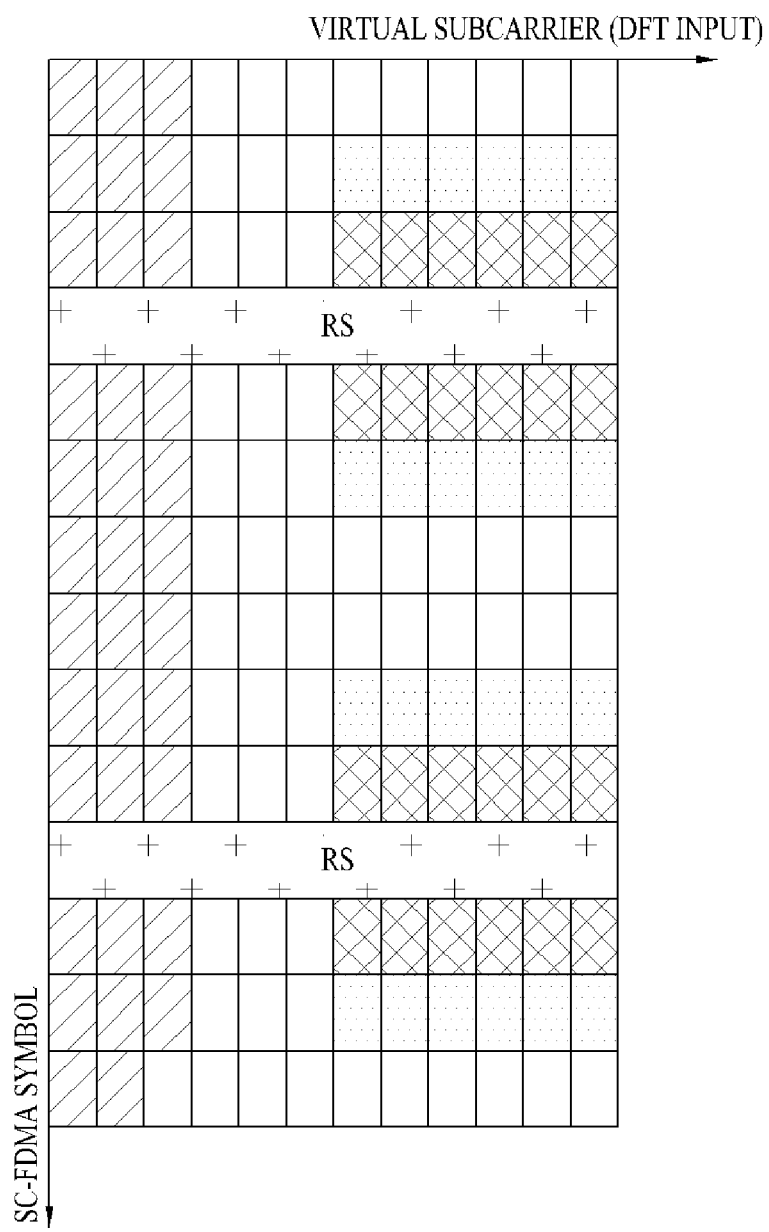
FIG. 15 illustrates a resource allocation structure in which data and control information are multiplexed into Physical Uplink Shared Channel (PUSCH) resources.

FIG. 15 illustrates a resource allocation structure in which data and control information (UCI) are multiplexed into PUSCH resources, as defined in the legacy LTE system (release 8 or 9).

An LTE-A uplink transmission entity (an LTE-A UE or an RN) may multiplex data and control information (an ACK/NACK, an RI, a CSI (e.g. a CQI and a PMI)) on a PUSCH and transmit the PUSCH. This multiplexing scheme may be referred to as a PUSCH piggyback with UCI scheme. In the case where the LTE-A uplink transmission entity transmits the PUSCH in a precoding-based transmission mode, there exists a need for a method for configuring a transmission mode for the data and control information (an ACK/NACK, an RS, and CSI).

In a situation where a higher layer configures a precoding-based transmission mode for uplink transmission from an LTE-A uplink transmission entity (an LTE-A UE or an RN), a transmission mode may be set for data and control information which are multiplexed into PUSCH resources (i.e. the PUSCH piggyback scheme) in the following Method C to Method G.

Method C

In a situation where a higher layer configures a precoding-based transmission mode for uplink transmission from an LTE-A uplink transmission entity (an LTE-A UE or an RN), if data and control information are multiplexed into PUSCH resources (i.e. the PUSCH piggyback scheme), the LTE-A uplink transmission entity may not operate in the precoding-based transmission mode. Instead, the LTE-A uplink transmission entity may multiplex the data and the control information into the PUSCH resources in the same manner as in the legacy LTE system (release 8 or 9) through dynamic adaptation to the Tx diversity mode, that is, through fallback. Accordingly, the Tx diversity mode may also be applied to the control information piggybacked to the PUSCH resources.

Method D

In a situation where a higher layer configures a precoding-based transmission mode for uplink transmission from an LTE-A uplink transmission entity (an LTE-A UE or an RN), if data and control information are multiplexed into PUSCH resources (i.e. the PUSCH piggyback scheme), an uplink transmission rank may be restricted by a UL grant PDCCH. That is, the uplink transmission rank may be fixed to 1 or selected between rank 1 and rank 2 through the UL grant PDCCH. This may be said that the uplink data transmission rank is fallen back to 1 or 2. Accordingly, the data and the control information multiplexed into the PUSCH resources may be precoded according to the rank indicated by the UL grant PDCCH, prior to transmission.

Method E

In a situation where a higher layer configures a precoding-based transmission mode for uplink transmission from an LTE-A uplink transmission entity (an LTE-A UE or an RN), if data and control information are multiplexed into PUSCH resources (i.e. the PUSCH piggyback scheme), different precoding-based transmission modes may be set for data and DM-RSs and for control information.

Because Hybrid Automatic Response reQuest (HARQ) is not used for UCI multiplexed into PUSCH resources, unlike data, it may not be preferable in terms of reliability to increase the transmission rank of the control information. Therefore, it is proposed that data is transmitted according to a rank indicated by a UL grant PDCCH DCI format and the transmission rank of control information is restricted (e.g. to or below 2).

More specifically, data and DM-RSs may be precoded using a precoder based on a rank indicated by a UL grant PDCCH, prior to transmission. On the other hand, the transmission rank of control information (an ACK/NACK, an RI, and CSI) may be preset to a specific value (e.g. rank 1 or rank 2) and the control information may be precoded using a part of column vectors of a specific precoding matrix. The column vectors of the precoding matrix correspond to precoding information for respective layers. Thus, if a precoding matrix used for data is composed of 4 columns (i.e. a precoding matrix for 4 layers), one of the column vectors of the precoding matrix may be used as precoding information for layer-1 (rank-1) transmission. Or, the control information may be precoded using a predetermined rank precoder best matching the precoding matrix used for the data.

Figure 16:
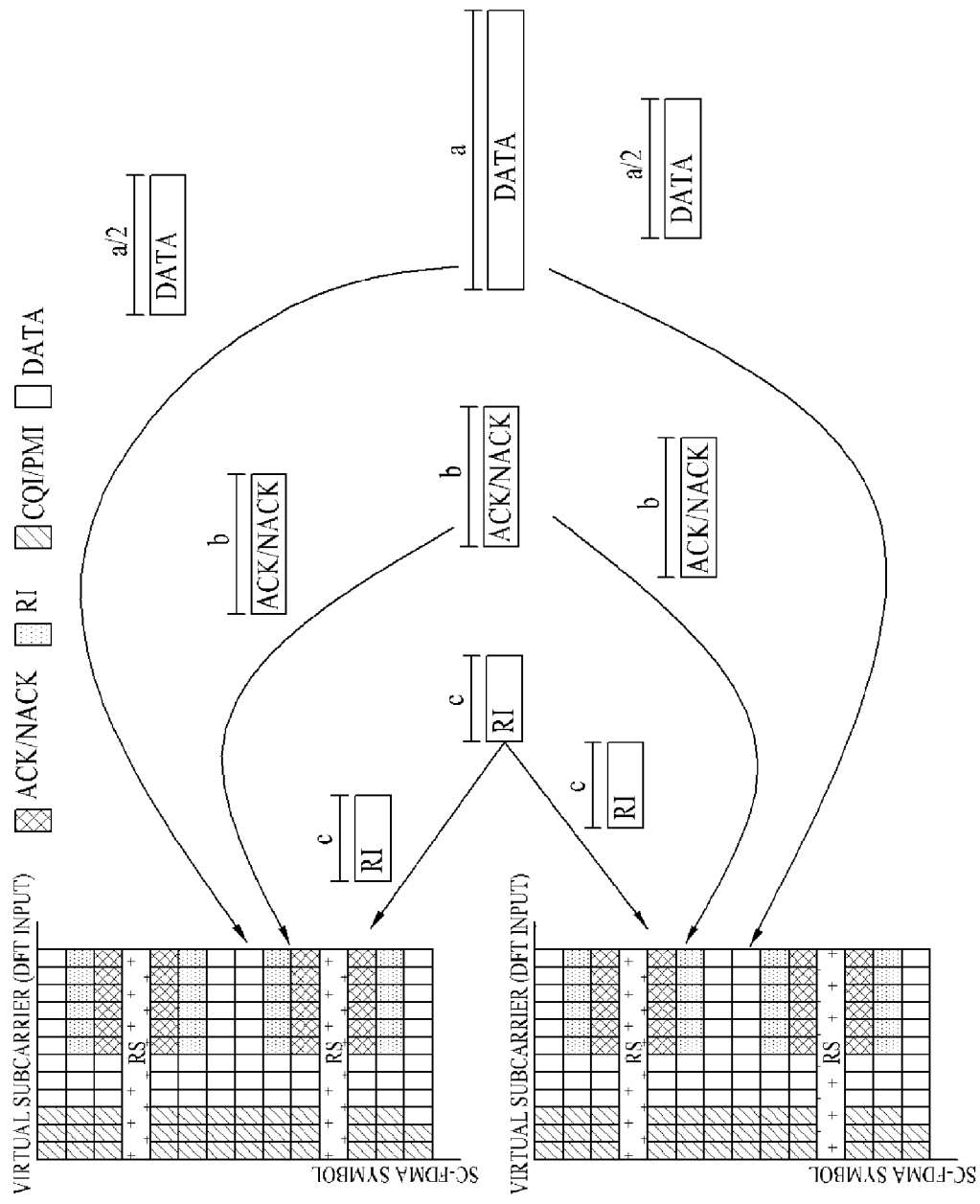
FIG. 16 illustrates a method for transmitting data, an ACKnowledgment/Negative ACKnowledgment (ACK/NACK), and a Rank Indicator (RI) that are multiplexed into PUSCH resources.
Figure 17:
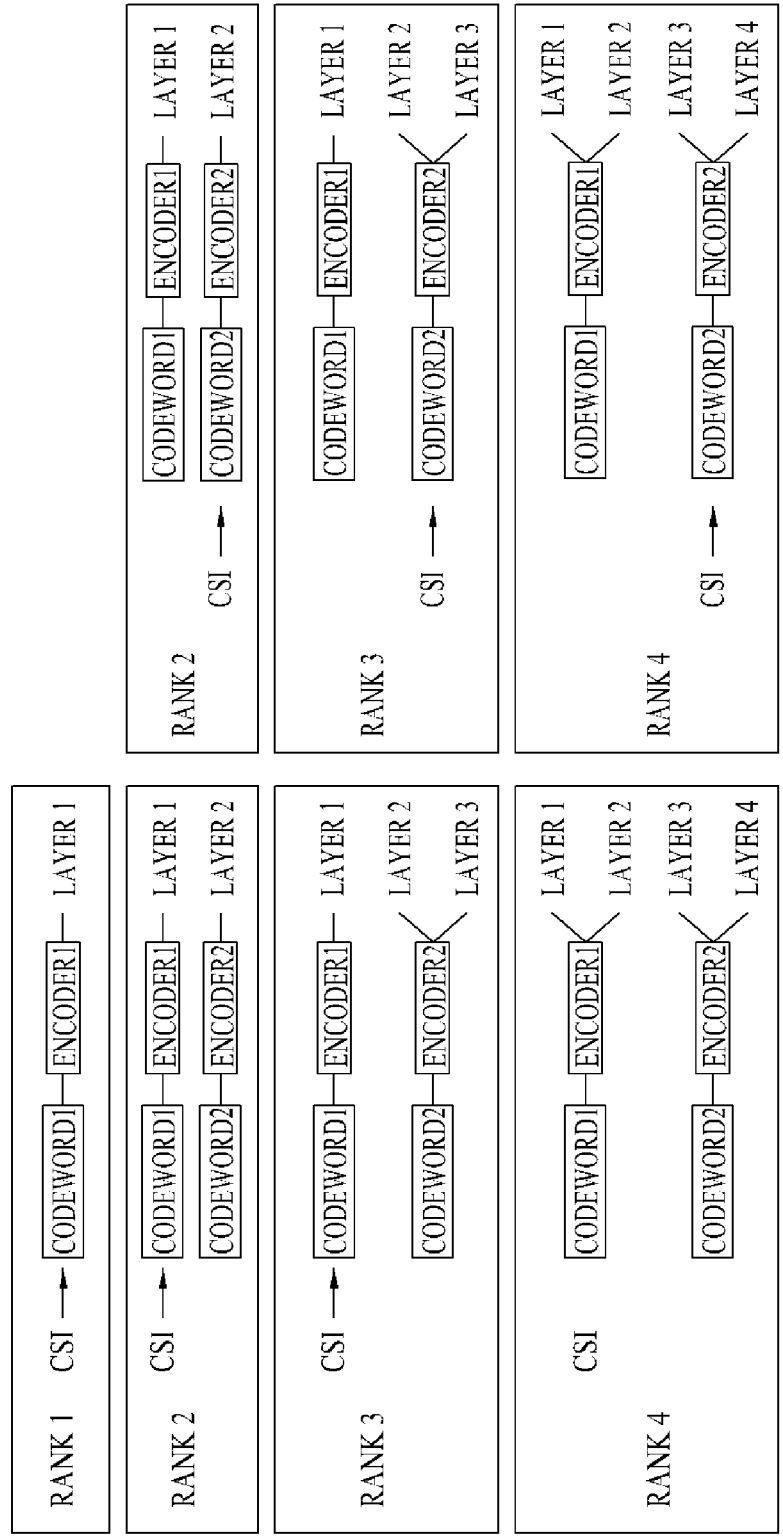
FIG. 17 illustrates the transmission ranks of Channel State Information (CSI) multiplexed with data into PUSCH resources.

This will be described in detail with reference to FIGS. 16 and 17. In FIGS. 16 and 17, when data is multiplexed with control information (an ACK/NACK, an RI, and CSI) into PUSCH resources, the data is precoded using a rank indicated by a UL grant PDCCH DCI format, whereas the control information is transmitted with a limited rank (rank 1 or rank 2). FIG. 16 illustrates an ACK/NACK and an RI as control information and FIG. 17 illustrates CSI as control information.

With reference to FIG. 16, a detailed description will be given of a case where different ranks are set for data and DM-RSs and for an ACK/NACK and an RI as control information, when the data and DM-RSs are multiplexed with the control information into PUSCH resources. FIG. 16 illustrates an exemplary transmission with rank 2, that is, layer 2 explicitly indicated by a UL grant PDCCH DCI format, to which the present invention is not limited. Thus it is to be understood that an ACK/NACK and an RI may be transmitted with rank 1 to rank 4 (or a higher rank when needed) based on the same principle illustrated in FIG. 16.

The data and DM-RSs are transmitted by rank-2 spatial multiplexing. For example, let the total amount of data to be transmitted be denoted by a. Then a/2 is transmitted through a layer with index #0 and a/2 is transmitted through a layer with index #1. For example, ACK/NACK information (before or after encoding) is transmitted through each layer after repetition or replication. That is, if the ACK/NACK has a b amount of information in total, b is transmitted through the layer with index #0 and b is transmitted through the layer with index #1. Likewise, RI information is also repeated or replicated and then transmitted through each layer. That is, if the total amount of information of an RI is c, c is transmitted through the layer with index #0 and c is transmitted through the layer with index #1. Therefore, it may be said that the data and DM-RSs are transmitted in the rank-2 spatial multiplexing transmission mode and the ACK/NACK and the RI are transmitted with rank 1 (a single layer).

With reference to FIG. 17, how to determine a rank for CSI such as a CQI and a PMI among control information multiplexed into PUSCH resources will be described below.

In FIG. 17, rank 1 to rank 4 are rank values explicitly indicated by a UL PDCCH DCI format. The ranks are for data multiplexed with control information into PUSCH resources. For the input of a codeword, an encoder outputs one or two layer signals and the mapping relationships between codewords and layer signals are illustrated in FIG. 17. CSI is transmitted for one codeword. That is, in case of two codewords, CSI is transmitted for one of the two codewords. Because a codeword associated with CSI is selected according to a predetermined rule, signaling the codeword is not necessary for uplink transmission and reception entities.

If a UL grant PDCCH DCI format indicates a rank value of 1 (rank 1 in FIG. 17), one codeword-based transmission is performed. CSI is transmitted for the single codeword. Since the CSI is transmitted through one layer, the rank of the CSI is rank 1.

If a UL grant PDCCH DCI format indicates a rank value of 2 (rank 2 in FIG. 17), two codeword-based transmissions are performed. As described before, CSI is transmitted for one of the two codewords. That is, the CSI is transmitted for codeword 1 in the left case of rank 2 transmission and for codeword 2 in the right case of rank 2 transmission in FIG. 17. In both cases, the CSI is transmitted through one layer, and thus the rank of the CSI is rank 1.

If a UL grant PDCCH DCI format indicates a rank value of 3 (rank 3 in FIG. 17), two codeword-based transmissions are performed. As described before, CSI is transmitted for one of the two codewords. If the CSI is transmitted for codeword 1 (in the left case of rank-3 transmission in FIG. 17), the CSI is transmitted through one layer and thus its rank is 1. On the other hand, if the CSI is transmitted for codeword 2 (in the right case of rank-3 transmission in FIG. 17), the CSI is transmitted through two layers, and thus the rank of the CSI is rank 2.

If a UL grant PDCCH DCI format indicates a rank value of 4 (rank 4 in FIG. 17), two codeword-based transmissions are performed. As described before, CSI is transmitted for one of the two codewords. That is, the CSI is transmitted for codeword 1 in the left case of rank-4 transmission and for codeword 2 in the right case of rank-4 transmission in FIG. 17. In both cases, the CSI is transmitted through two layers, and thus the rank of the CSI is rank 2.

In this regard, in the case where a high-level MCS is selected in selecting a codeword for which CSI is to be transmitted, if a UL grant PDCCH DCI format indicates rank 1 and rank 2, the CSI is transmitted with rank 1. If a UL grant PDCCH DCI format indicates rank 3 and rank 4, the CSI is transmitted with rank 2. In the case where a low-level MCS is selected in selecting a codeword for which CSI is to be transmitted, if a UL grant PDCCH DCI format indicates rank 1 to rank 3, the CSI is transmitted with rank 1. If a UL grant PDCCH DCI format indicates rank 4, the CSI is transmitted with rank 2.

Only specific control information may be precoded based on a predetermined rank and the other control information may be precoded based on the same rank and precoding as used for data transmission, rather than all control information (an ACK/NACK, an RI, and CSI) is precoded based on a different rank from that of data. For example, the ACK/NACK and the RI among the control information may be precoded based on a predetermined rank (e.g. rank 1) prior to transmission, whereas the CSI may be precoded based on a rank indicated by a UL grant PDCCH and a precoding scheme corresponding to the rank, like data.

Method F

In a situation where a higher layer configures a precoding-based transmission mode for uplink transmission from an LTE-A uplink transmission entity (an LTE-A UE or an RN), if data and control information are multiplexed into PUSCH resources (i.e. the PUSCH piggyback scheme), the data and DM-RSs may be transmitted in a precoding-based transmission mode, while the control information may be transmitted in a Tx diversity mode.

More specifically, the data information and the DM-RSs may be precoded using a precoder corresponding to a rank indicated by a UL grant PDCCH and then transmitted. Meanwhile, the control information (an ACK/NACK, an RI, and CSI) may be transmitted in the Tx diversity mode.

Rather than the Tx diversity mode is applied to all of the control information (the ACK/NACK, RI, and CSI) unlike the data, only specific control information may be transmitted in the Tx diversity mode and the other control information may be precoded based on the same rank and precoding as used for the data transmission. For example, the ACK/NACK and the RI among the control information may be transmitted in a predetermined Tx diversity mode, and the CSI may be precoded without Tx diversity based on a rank indicated by a UL grant PDCCH and a precoding scheme corresponding to the rank, like the data. Accordingly, as a rank-2 or higher-rank spatial multiplexing scheme is applied to CSI encoding similarly to Method I as described later, the amount of physical resources carrying the CSI may be reduced and data transmission efficiency may be increased.

Method G

In a situation where a higher layer configures a precoding-based transmission mode for uplink transmission from an LTE-A uplink transmission entity (an LTE-A UE or an RN), if data and control information are multiplexed into PUSCH resources (i.e. the PUSCH piggyback scheme), both the data and the control information may be precoded based on a rank indicated by a UL grant PDCCH.

When the rank-2 or higher-rank precoding-based spatial multiplexing transmission mode is used in Method C to Method G, the number of modulation symbols, effective code rate, and physical transmission resource size of control information multiplexed into PUSCH resources need to be calculated in a new manner other than a conventional manner. Specifically, among the control information, an ACK/NACK is located in symbols adjacent to DM-RS transmission symbols by puncturing physical transmission resources for data transmission and an RI occupies physical transmission resources through rate matching in symbols adjacent to the ACK/NACK transmission symbols, in the PUSCH resources. If the rank-2 or higher-rank precoding-based spatial multiplexing transmission mode is applied to transmission of the ACK/NACK and the RI, the number of modulation symbols of the control information multiplexed into the PUSCH resources, its related effective code rate, and the size of physical resources in which the control information is arranged need to be calculated in a new method other than that defined in the legacy LTE system (e.g. release 8 or 9), as proposed below.

Method H

Physical resources may be assigned to an ACK/NACK and an RI multiplexed into PUSCH resources in the conventional manner as done in the legacy LTE system (release 8 or 9). In addition, the size of a coded bit stream may be increased by as much as an increase in a spatial multiplexing rate, when the ACK/NACK and the RI are encoded. Therefore, even though the ACK/NACK and the RI are transmitted through rank-2 or higher-rank spatial multiplexing, a lower effective code rate may be achieved and their transmission may be rendered robust.

Method I

In the case where an ACK/NACK or an RI multiplexed into PUSCH resources is transmitted in a spatial multiplexing transmission mode, physical resources less than required by an increased spatial multiplexing rate may be assigned to the ACK/NACK or the RI. Therefore, when the ACK/NACK and the RI are transmitted through rank-2 or higher-rank spatial multiplexing, less physical resources may be used for the ACK/NACK and the RI and data transmission efficiency may be increased.

Figure 18:
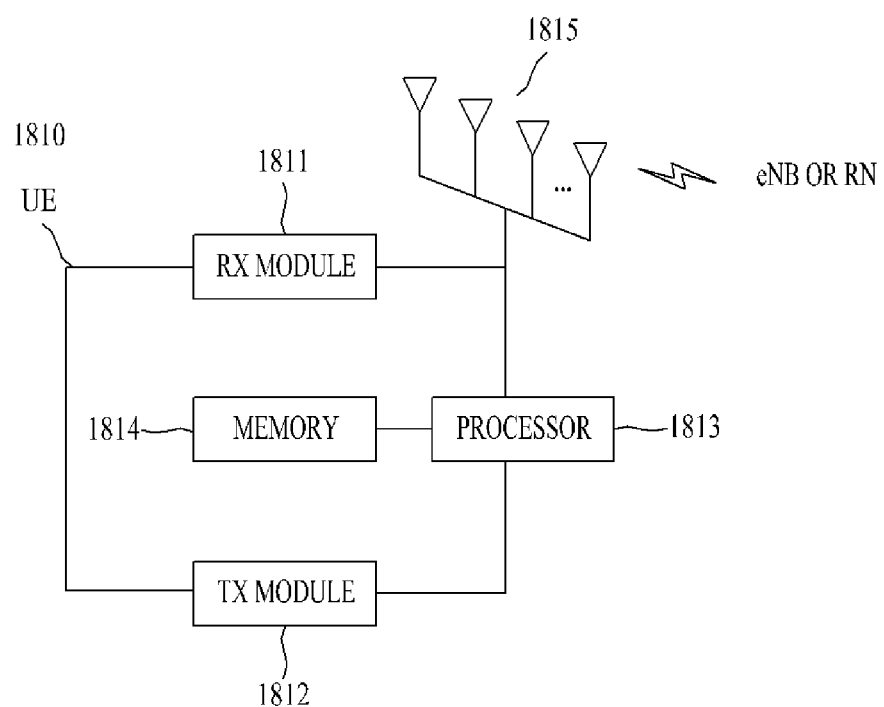
FIG. 18 is a block diagram of a User Equipment (UE) according to an embodiment of the present invention.

FIG. 18 is a block diagram of a UE and an eNB according to an embodiment of the present invention.

A UE 1810 may include a Reception (Rx) module 1811, a Transmission (Tx) module 1812, a processor 1813, a memory 1814, and antennas 1815. The Rx module 1811 may receive data and control signals from the outside (e.g. an eNB or an RN). The Tx module 1812 may transmit data and control signals to the outside (e.g. an eNB or an RN). The processor 1813 is connected to various components of the UE 1810 such as the Rx module 1811, the Tx module 1812, and the memory 1814, for communication and may provide overall control to the UE 1810 and its components. The plural antennas 1815 may support MIMO transmission and reception of the UE 1810.

The UE 1810 according to the embodiment of the present invention may transmit an uplink signal in a multiple antenna wireless communication system. The processor 1813 may control the Rx module 1811 to receive a UL grant PDCCH indicating a first rank. The processor 1813 may also control the UE 1810 to precode uplink data based on the first rank, precode uplink control information based on a second rank, and multiplex the precoded uplink data and control information into PUSCH resources. In addition, the processor 1813 may control the Tx module 1812 to transmit the multiplexed uplink data and control information. Herein, the uplink control information may include CSI.

The first rank included in the UL grant information may, for example, range from 1 to 4 as the rank of precoding for the uplink data. The second rank is preset and shared between uplink signal transmission and reception entities. For example, the second rank may be 1 for an ACK/NACK and an RI among the uplink control information, as described before with reference to FIG. 16. As described before with reference to FIG. 17, the CSI may be transmitted only for one codeword of uplink data. Therefore, the second rank may be 1 or 2 for CSI precoding. That is, the second rank may be set to be equal to or smaller than the first rank.

The uplink data may be precoded using a precoding matrix corresponding to the first rank indicated by the UL grant information, and the uplink control information (e.g. the CSI) may be precoded using a precoding matrix (e.g. a first precoding matrix) corresponding to the second rank. Since the second rank is equal to or smaller than the first rank, the CSI may be precoded using one or more column vectors of the first precoding matrix.

The processor 1813 may process received information and transmission information. The memory 1814 may store the processed information for a predetermined time and may be replaced with a component such as a buffer (not shown).

While the description has been given mainly of the UE 1810 as an uplink transmission entity with reference to FIG. 18, it is to be clearly understood that the same thing applies to an RN as an uplink transmission entity.

The embodiments of the present invention may be achieved by various means, for example, hardware, firmware, software, or a combination thereof.

In a hardware configuration, an embodiment of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for transmitting an uplink signal by a User Equipment (UE) in a wireless communication system supporting multiple antenna transmission, the method comprising:
receiving a Physical Downlink Control Channel (PDCCH) that includes uplink grant information indicating a first rank value;
determining a rank value for determining precoding matrix to be applied to uplink control information between the first rank value and a second rank value according to a type of the uplink control information, wherein the second value is not indicated by the uplink grant information but predetermined value smaller than the first value;
precoding uplink data using a first precoding matrix corresponding to the first rank value and precoding uplink control information using a second precoding matrix using the determined rank value;
multiplexing the precoded uplink data and the precoded uplink control information on Physical Uplink Shared Channel (PUSCH) resources; and
transmitting the multiplexed uplink data and uplink control information,
wherein when the uplink control information is a first type of control information, the rank value is determined as the first value, and
wherein when the uplink control information is a second type of control information, which is different from the first type uplink control information, the rank value is determined as the second value.

2. The method according to claim 1,
wherein the second type uplink control information includes Channel State Information (CSI), and
wherein the CSI is transmitted only for one codeword of the uplink data.

3. The method according to claim 1,
wherein the first rank value is a transmission rank of the uplink data, and
wherein the second rank value is shared between an uplink signal transmitter and an uplink signal receiver.

4. The method according to claim 1,
wherein the second type uplink control information is precoded using a column vector which is a part of the first precoding matrix.

5. The method according to claim 1, wherein the second rank value is 1 or 2.

6. The method according to claim 1, wherein the second type uplink control information further includes at least one of ACKnowledgment/Negative ACKnowledgment (ACK/NACK) information and a Rank Indicator (RI).

7. A User Equipment (UE) for transmitting an uplink signal in a wireless communication system supporting multiple antenna transmission, the UE comprising:
a receiver configured to receive a downlink signal;
a transmitter configured to transmit the uplink signal; and
a processor connected to the receiver and the transmitter, and configured to control an operation of the UE,
wherein the processor is further configured to:
receive a Physical Downlink Control Channel (PDCCH) that includes uplink grant information indicating a first rank value through the receiver,
determine a rank value for determining precoding matrix to be applied to uplink control information between the first rank value and a second rank value according to a type of the uplink control information, wherein the second value is not indicated by the uplink grant information but predetermined value smaller than the first value,
precode uplink data using a first precoding matrix corresponding to the first rank value and precode uplink control information using a second precoding matrix using the determined rank value,
multiplex the precoded uplink data and the precoded uplink control information on Physical Uplink Shared Channel (PUSCH) resources, and
transmit the multiplexed uplink data and the uplink control information through the transmitter,
wherein when the uplink control information is a first type of control information, the rank value is determined as the first value, and
wherein when the uplink control information is a second type of control information, which is different from the first type uplink control information, the rank value is determined as the second value.

* * * * *